(12) United States Patent  
Hartmann et al.

(10) Patent No.: US 12,455,158 B2  
(45) Date of Patent: Oct. 28, 2025

(54) METROLOGY SYSTEM WITH HIGH SPEED POSITION AND ORIENTATION TRACKING MODE

(71) Applicant: Mitutoyo Corporation, Kanagawa-ken (JP)

(72) Inventors: Nick Hartmann, Kirkland, WA (US); Norman Laman, Kenmore, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 78 days.

(21) Appl. No.: 18/542,066

(22) Filed: Dec. 15, 2023

(65) Prior Publication Data

US 2025/0198744 A1  Jun. 19, 2025

(51) Int. Cl.
  *G01B 11/00* (2006.01)
  *B25J 9/16* (2006.01)
  (Continued)

(52) U.S. Cl.
  CPC ........... *G01B 11/005* (2013.01); *B25J 9/1694* (2013.01); *B25J 9/1697* (2013.01); *G01B 11/002* (2013.01);
  (Continued)

(58) Field of Classification Search
  CPC ... G01B 11/002; G01B 11/005; G01B 11/007; G01B 11/03; G01B 11/14; G01B 11/26;
  (Continued)

(56) References Cited

U.S. PATENT DOCUMENTS 4,574,199 A * 3/1986 Pryor ................... G01B 11/007
  33/503
4,613,943 A   9/1986 Miyake et al.
  (Continued)

FOREIGN PATENT DOCUMENTS

CN    110936373 A    3/2020
CN    112070133 A * 12/2020 ............. G06F 18/25
  (Continued)

OTHER PUBLICATIONS

Hamamatsu, "iPMSEL," June 2006, URL=https://www.hamamatsu.com/us/en/our-company/business-domain/central-research-laboratory/optical-materials/ipmsel.html, retrieved on Aug. 22, 2023. (12 pages).
  (Continued)

*Primary Examiner* — Gordon J Stock, Jr.
(74) *Attorney, Agent, or Firm* — Seed IP Law Group LLP

(57) ABSTRACT

A metrology system is provided for use with a movement system that moves an end tool. The metrology system includes a sensor configuration, a light beam source configuration and a processing portion. The light beam source configuration directs light beams to light beam sensors to indicate a position and orientation of the light beam source configuration. In a high speed operating mode (e.g., an alternative to a standard speed operating mode), the metrology system determines a region of interest ("ROI") for each light beam sensor of a set of light beam sensors, wherein each ROI includes a measurement spot produced by a light beam. Measurement signals are processed resulting from the ROIs, and a position and orientation of the light beam source configuration is determined. In various implementations, the ROIs are determined (e.g., including position and/or size, etc.) based at least in part on position information from the movement system.

21 Claims, 13 Drawing Sheets

(51) Int. Cl.
  *G01B 11/14* (2006.01)
  *G01B 11/26* (2006.01)
  *G01B 21/04* (2006.01)
(52) U.S. Cl.
  CPC ............ *G01B 11/007* (2013.01); *G01B 11/14* (2013.01); *G01B 11/26* (2013.01); *G01B 21/047* (2013.01)
(58) Field of Classification Search
  CPC ....... G01B 11/27; G01B 11/272; G01B 11/28; G01B 11/285; G01B 21/04; G01B 21/042; G01B 21/045; G01B 21/047; G01B 21/16; G01B 21/22; G01B 21/24; G01B 21/28; B25J 9/1692; B25J 9/1694; B25J 9/1697; B25J 13/08; B25J 13/086; B25J 13/088; B25J 13/089; B25J 19/00; B25J 19/02; B25J 19/021; B25J 19/022; B25J 19/023; B25J 19/025
  See application file for complete search history.

(56) References Cited

U.S. PATENT DOCUMENTS

| | | |
|---|---|---|
| 4,725,965 A | 2/1988 | Keenan |
| 4,831,549 A | 5/1989 | Red et al. |
| 5,086,401 A | 2/1992 | Glassman et al. |
| 5,105,368 A | 4/1992 | Alexandersen et al. |
| 5,297,238 A | 3/1994 | Wang et al. |
| 5,617,335 A | 4/1997 | Hashima et al. |
| 5,798,947 A | 8/1998 | Ye et al. |
| 5,876,325 A | 3/1999 | Mizuno et al. |
| 6,222,940 B1 | 4/2001 | Wenzel et al. |
| 6,640,008 B1 | 10/2003 | Lee et al. |
| 6,681,151 B1 | 1/2004 | Weinzimmer et al. |
| 6,781,694 B2 | 8/2004 | Nahum et al. |
| 6,937,349 B2 | 8/2005 | Jones et al. |
| 7,105,753 B1 | 9/2006 | Lapstun et al. |
| 7,532,949 B2 | 5/2009 | Ban et al. |
| 7,845,560 B2 | 12/2010 | Emanuel et al. |
| 8,111,905 B2 * | 2/2012 | Campbell ............ G01N 21/8806 382/152 |
| 8,681,344 B2 * | 3/2014 | Spruck ................ G01B 11/002 356/614 |
| 8,773,526 B2 * | 7/2014 | Bryll ..................... G06V 10/145 348/94 |
| 8,792,963 B2 | 7/2014 | Zhao et al. |
| 8,803,978 B2 * | 8/2014 | Wilson .................... G06T 7/246 348/169 |
| 8,885,177 B2 * | 11/2014 | Ben-Yishai .......... G01B 11/002 356/614 |
| 8,981,324 B2 | 3/2015 | Rigney et al. |
| 8,989,898 B2 | 3/2015 | DeVlieg |
| 9,050,728 B2 | 6/2015 | Ban et al. |
| 9,383,181 B2 * | 7/2016 | Engel ..................... G01B 5/008 |
| 9,572,549 B2 | 2/2017 | Belevich et al. |
| 9,797,706 B2 * | 10/2017 | Jordil .................... G01B 21/047 |
| 10,054,422 B2 * | 8/2018 | Bockem ............... G01B 21/042 |
| 10,058,996 B2 | 8/2018 | Hosek et al. |
| 10,099,380 B2 | 10/2018 | Ishige et al. |
| 10,625,427 B2 | 4/2020 | Troy et al. |
| 10,706,562 B2 * | 7/2020 | Haverkamp ........... G01B 5/008 |
| 10,751,883 B2 | 8/2020 | Nahum |
| 10,871,366 B2 | 12/2020 | Nahum |
| 10,913,156 B2 | 2/2021 | Nahum et al. |
| 11,002,529 B2 | 5/2021 | Nahum |
| 11,725,929 B2 | 8/2023 | Haverkamp |
| 11,745,354 B2 | 9/2023 | Atherton et al. |
| 12,174,005 B2 * | 12/2024 | Tobiason ............... G01B 11/14 |
| 2003/0144765 A1 | 7/2003 | Habibi et al. |
| 2005/0225278 A1 | 10/2005 | Ban et al. |
| 2006/0017022 A1 | 1/2006 | Rigney et al. |
| 2007/0296366 A1 | 12/2007 | Quaid et al. |
| 2009/0180667 A1 | 7/2009 | Mahan et al. |
| 2009/0234502 A1 | 9/2009 | Ueyama et al. |
| 2010/0331855 A1 | 12/2010 | Zhao et al. |
| 2011/0029131 A1 | 2/2011 | Ban et al. |
| 2013/0035791 A1 | 2/2013 | Chiu et al. |
| 2013/0090554 A1 | 4/2013 | Zvuloni et al. |
| 2013/0123982 A1 | 5/2013 | Chiu et al. |
| 2013/0158947 A1 * | 6/2013 | Suzuki .................. G01B 11/00 702/155 |
| 2014/0157610 A1 | 6/2014 | Garvey et al. |
| 2014/0301632 A1 | 10/2014 | Ikeda et al. |
| 2014/0343727 A1 | 11/2014 | Calkins et al. |
| 2015/0158181 A1 | 6/2015 | Kawamura et al. |
| 2016/0008988 A1 | 1/2016 | Kennedy et al. |
| 2016/0039096 A1 | 2/2016 | Wallack et al. |
| 2016/0136812 A1 | 5/2016 | Hosek et al. |
| 2016/0151915 A1 | 6/2016 | Nishi et al. |
| 2016/0223316 A1 | 8/2016 | Jordil et al. |
| 2016/0291160 A1 | 10/2016 | Zweigle et al. |
| 2017/0140521 A1 | 5/2017 | Sakaguchi et al. |
| 2017/0148154 A1 | 5/2017 | Nakao |
| 2017/0151671 A1 | 6/2017 | Ishige et al. |
| 2017/0182665 A1 | 6/2017 | Okuyama et al. |
| 2018/0004188 A1 | 1/2018 | Yamaguchi et al. |
| 2018/0018778 A1 | 1/2018 | Haverkamp et al. |
| 2018/0153437 A1 | 6/2018 | Schwartz et al. |
| 2018/0272490 A1 | 9/2018 | Brenner et al. |
| 2018/0279993 A1 | 10/2018 | Crawford et al. |
| 2018/0361571 A1 | 12/2018 | Georgeson et al. |
| 2018/0361595 A1 | 12/2018 | Troy et al. |
| 2018/0373158 A1 | 12/2018 | Baier et al. |
| 2019/0005600 A1 | 1/2019 | Hazeyama |
| 2019/0015980 A1 | 1/2019 | Kojima et al. |
| 2019/0056218 A1 | 2/2019 | Ulmer et al. |
| 2019/0099887 A1 | 4/2019 | Huang et al. |
| 2019/0195607 A1 | 6/2019 | Nahum |
| 2019/0256300 A1 | 8/2019 | Shimamura et al. |
| 2019/0291277 A1 | 9/2019 | Oleynik |
| 2023/0099779 A1 | 3/2023 | Redgewell et al. |
| 2023/0204340 A1 | 6/2023 | Tobiason et al. |

FOREIGN PATENT DOCUMENTS

| | | | | |
|---|---|---|---|---|
| CN | 113390343 A * | 9/2021 | ............... | G05D 3/12 |
| DE | 10252647 A1 | 5/2004 | | |
| WO | WO 2011036033 A1 | 3/2011 | | |

OTHER PUBLICATIONS

Krajník et al., "External Localization System for Mobile Robotics," *16th International Conference on Advanced Robotics (ICAR)*, Nov. 25-29, 2013, Montevideo, Uruguay. (6 Pages).

Nguyen et al., "A New Full Pose Measurement Method for Robot Calibration," Sensors 13(7): 9132-9147, 2013

Pérez et al., "Robot Guidance Using Machine Vision Techniques in Industrial Environments: A Comparative Review," *Sensors* 16(3):335, 2016. (26 pages).

Scara, URL=https://en.wikipedia.org/w/index.php?title=;SCARA &oldid=S38861482, Archive Date Agril 29, 2018. (2 pages).

* cited by examiner

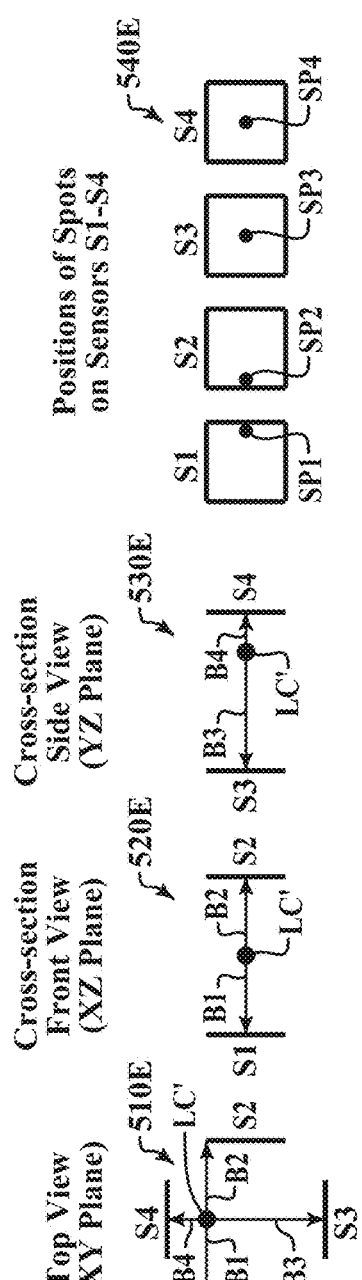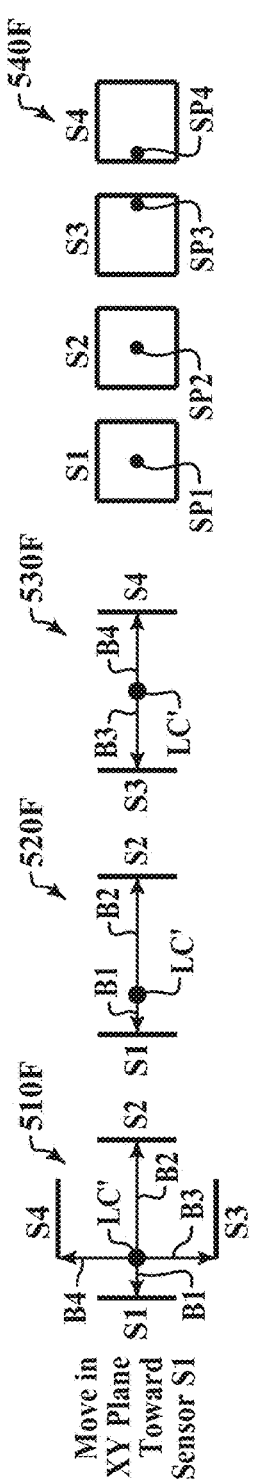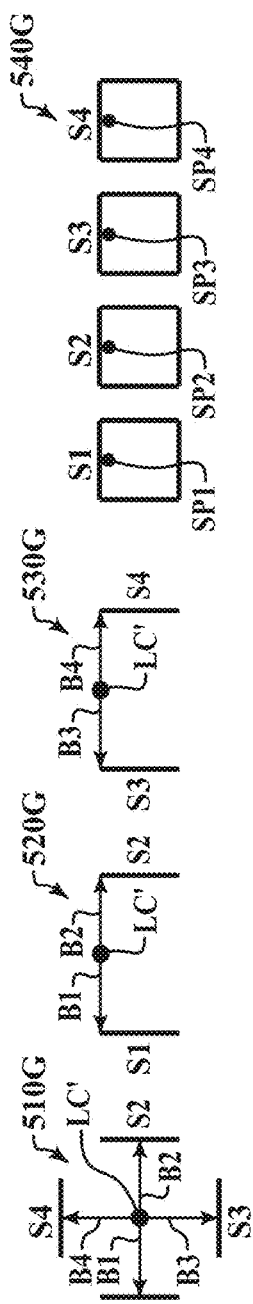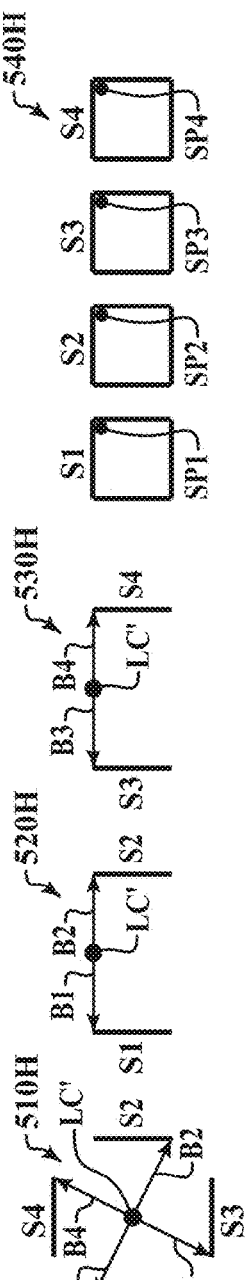

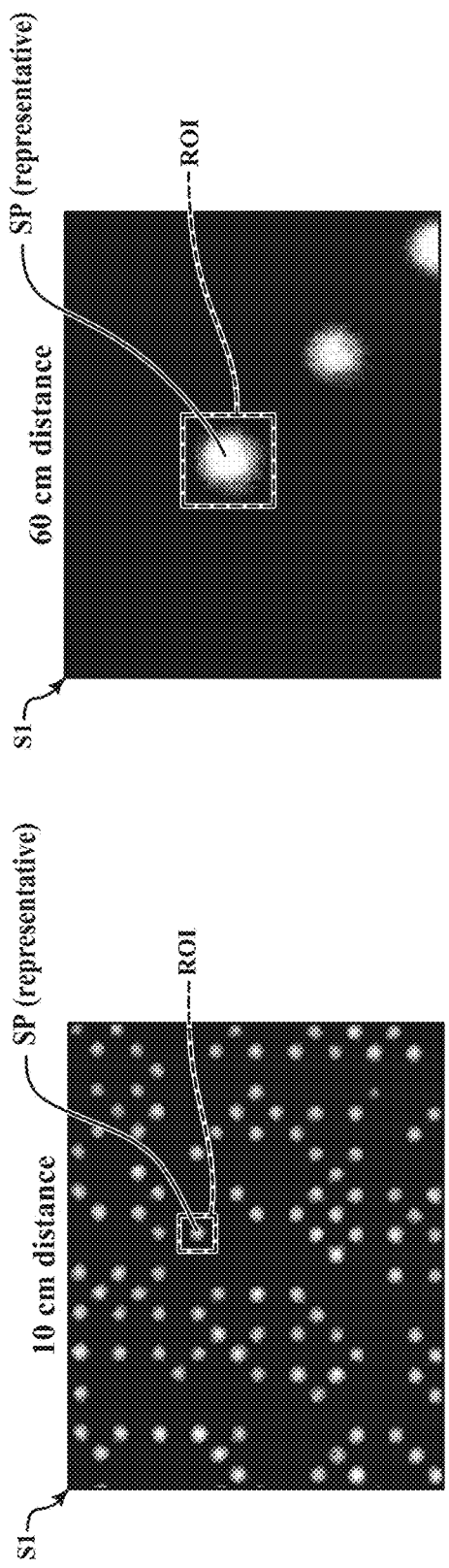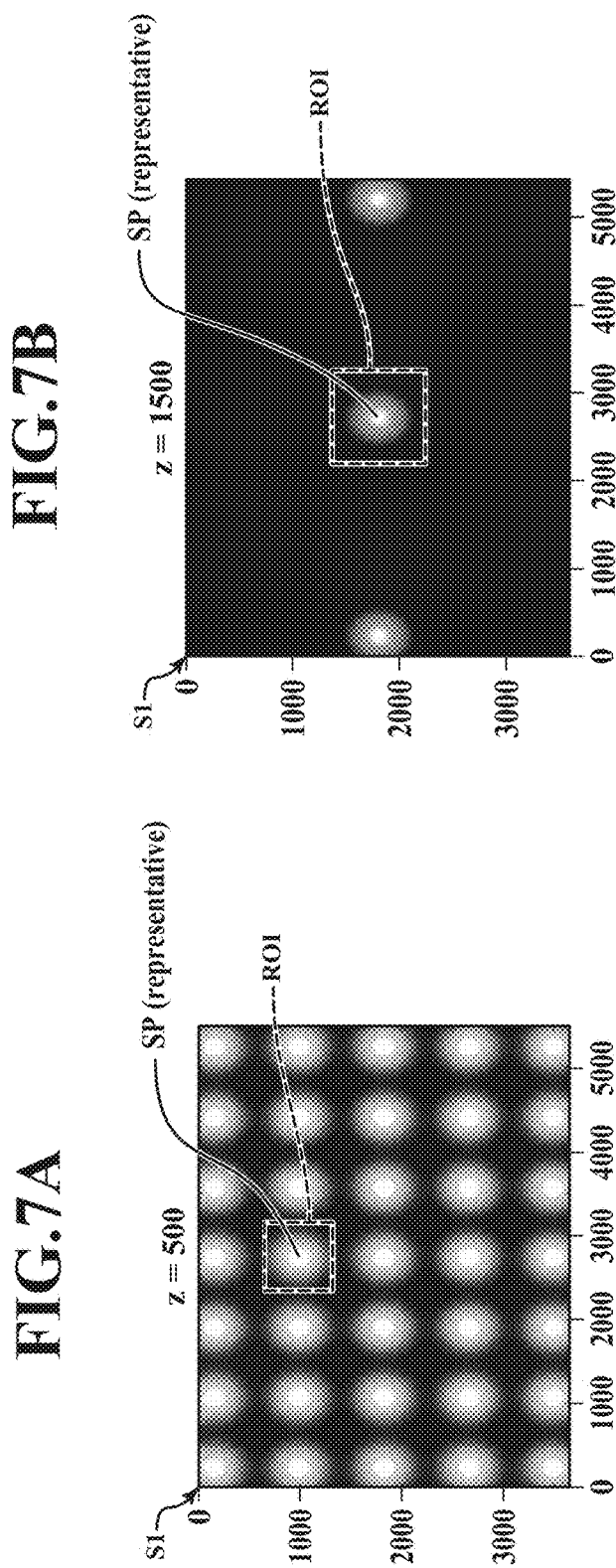

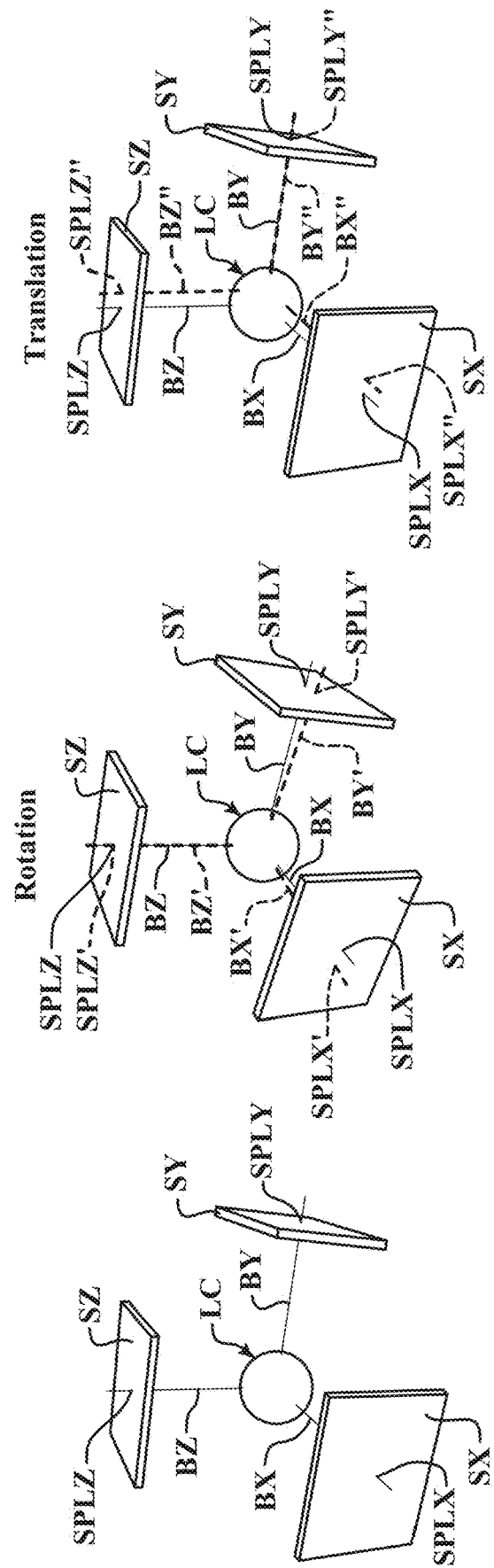

METROLOGY SYSTEM WITH HIGH SPEED POSITION AND ORIENTATION TRACKING MODE

BACKGROUND

Technical Field

This disclosure relates to metrology and movement systems, and more particularly to a metrology system that may be utilized with a movement system, such as a robot, for tracking position and orientation.

Description of the Related Art

Manufacturing, workpiece inspection, and other processes frequently use mechanical movement systems for performing certain functions. For example, robot systems or other movement systems may be utilized to move an end tool for performing certain operations (e.g., in relation to workpiece inspection, manufacturing, etc.). For certain applications, various types of robots that may be utilized include articulated robots, selective compliance articulated robot arm (SCARA) robots, Cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.).

U.S. Pat. No. 4,725,965 (referred to herein as the '965 patent), which is hereby incorporated herein by reference in its entirety, discloses certain calibration techniques for improving the accuracy of a SCARA system. As described in the '965 patent, to calibrate a kinematic model, arm portions are placed in a first configuration to locate an end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated. As further described in the '965 patent, the calibration technique may include the use of certain cameras.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.). A system that can provide improvements with regard to such issues (e.g., for increasing the reliability, repeatability, speed, etc., of position and orientation determination for processes such as workpiece measurements, manufacturing, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a metrology system is provided for use with a movement system that moves an end tool. The movement system comprises a movable configuration and a motion control system. The movable configuration comprises an end tool mounting configuration that an end tool is configured to mount to. The motion control system is configured to control an end tool position and orientation, based at least in part on controlling the movable configuration so as to move at least a portion of an end tool that is mounted to the end tool mounting configuration within a movement volume.

The metrology system comprises a sensor configuration, a light beam source configuration and a processing portion. The sensor configuration comprises a plurality of light beam sensors located at fixed positions. The light beam source configuration is configured to direct light beams to light beam sensors of the sensor configuration to indicate a position and orientation of the light beam source configuration. The light beam source configuration is configured to be coupled to at least one of an end tool or the end tool mounting configuration. At least some light beams that are directed toward the light beam sensors are configured to produce measurement spots in positions on the light beam sensors that cause the light beam sensors to produce corresponding measurement signals.

The processing portion is configured to process measurement signals from the light beam sensors of the sensor configuration to determine a position and orientation of the light beam source configuration. As part of a first operating mode (e.g., a high speed operating mode), during which the movement system is configured to move the end tool and correspondingly the light beam source configuration to a plurality of positions, for each position the metrology system is configured to: determine a region of interest for each light beam sensor of a set of light beam sensors, wherein each region of interest includes a measurement spot produced by a light beam from the light beam source configuration; process measurement signals resulting from the regions of interest of the light beam sensors; and determine a position and orientation of the light beam source configuration based at least in part on the processed measurement signals. In various implementations, the determining of the regions of interest comprises determining positions and/or sizes of the regions of interest on the respective light beam sensors. In various implementations, the regions of interest are determined based at least in part on position information that is received from the movement system.

In various implementations, as part of a second operating mode (e.g., a standard speed operating mode) that is an alternative to the first operating mode, during which the movement system is configured to move the end tool and correspondingly the light beam source configuration to a plurality of positions, for each position the metrology system is configured to: process measurement signals from full sensing areas of the light beam sensors; and determine a position and orientation of the light beam source configuration based at least in part on the processed measurement signals.

In accordance with another aspect, a method is provided for operating the metrology system with the movement system that moves an end tool. The method includes determining that the metrology system will be operated in a first operating mode. The metrology system is then operated in the first operating mode, during which the movement system moves the end tool and correspondingly a light beam source configuration to a plurality of positions, and for each position the metrology system: operates the light beam source configuration to direct light beams to light beam sensors of a sensor configuration to indicate a position and orientation of the light beam source configuration; determines a region of interest for each light beam sensor of a set of light beam sensors, wherein each region of interest includes a measurement spot produced by a light beam from the light beam source configuration; processes measurement signals resulting from the regions of interest of the light beam sensors; and determines a position and orientation of the light beam source configuration based at least in part on the processed measurement signals.

BRIEF DESCRIPTION OF THE SEVERAL VIEWS OF THE DRAWINGS

FIGS. 5A-5H are diagrams illustrating four example light beams of a light beam source configuration and corresponding measurement spots on four sensors of a sensor configuration for different positions and orientations of the light beam source configuration;

FIGS. 7A and 7B are diagrams illustrating a first arrangement of measurement spots as formed on a sensor with a light beam source configuration at first and second distances from the sensor, respectively;

FIGS. 8A and 8B are diagrams illustrating a second arrangement of measurement spots as formed on a sensor with a light beam source configuration at first and second distance from the sensor, respectively;

FIGS. 10A-10C are diagrams illustrating certain techniques for determining a position and orientation of a light beam source configuration;

DETAILED DESCRIPTION

Figure 1:
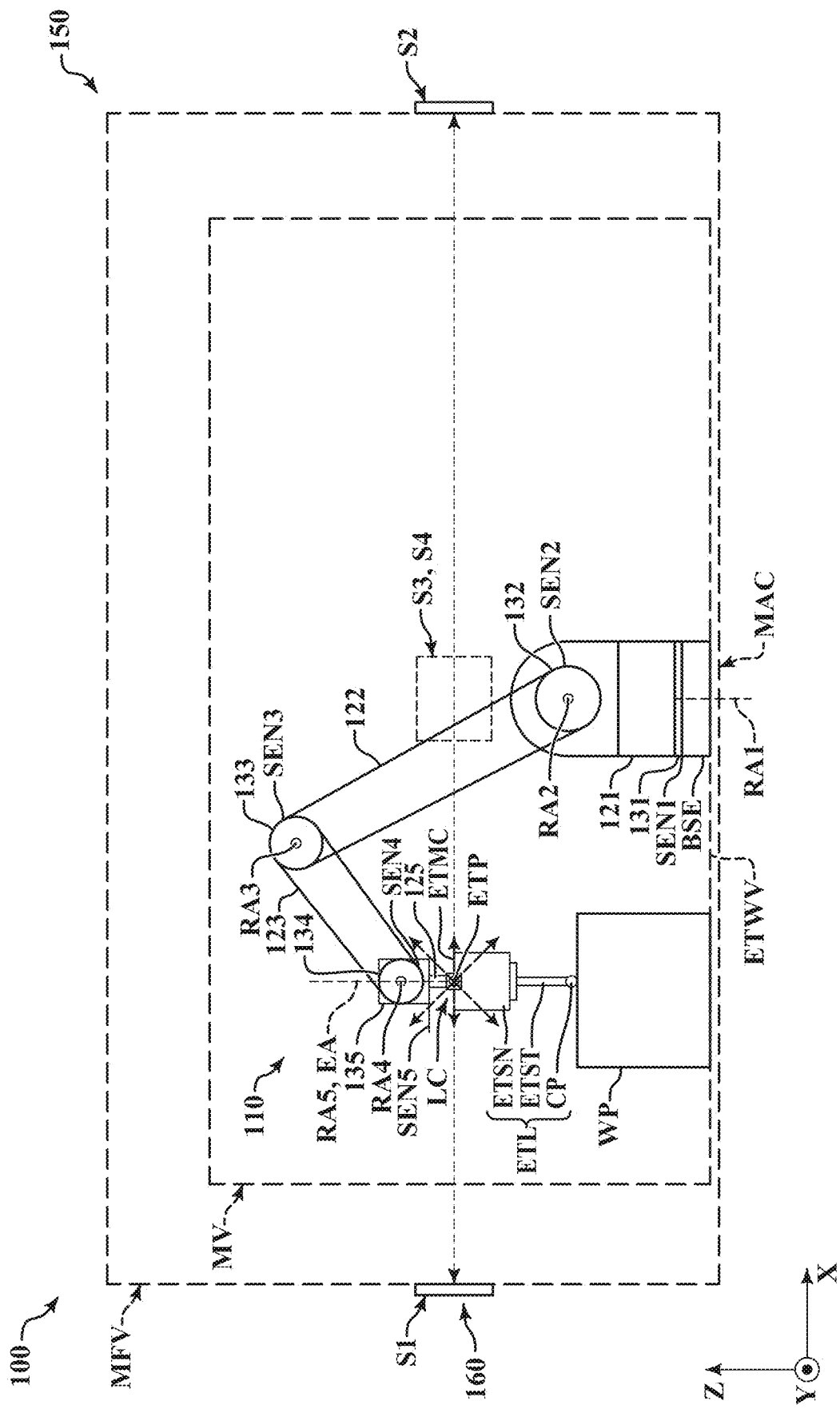
FIG. 1 is a block diagram of a first exemplary implementation of a movement and metrology system.

FIG. 1 is a block diagram of a first exemplary implementation of a movement and metrology system 100 including a movement system 110 and a metrology system 150. The movement system 110 (e.g., an articulated robot) includes a movable configuration MAC (e.g., a movable arm configuration) and a motion control and processing system 140. The metrology system 150 includes a sensor configuration 160, a light beam source configuration LC, and a metrology system position and orientation processing portion 190. In the configuration of FIG. 1, the light beam source configuration LC (e.g., illustrated as directing arrowed light beams in different directions, including toward the light beam sensors S1 and S2) is coupled to the end tool ETL. As will be described in more detail below, the metrology system 150 may be utilized for tracking a position and orientation (e.g., of the end tool ETL as moved by the movement system 110).

In the example of FIG. 1, the movable configuration MAC includes a lower base portion BSE, arm portions 121-125, motion mechanisms 131-135, position sensors SEN1-SEN5, and an end tool mounting configuration ETMC. In various implementations, some or all of the arm portions 121-125 may be mounted to respective motion mechanisms 131-135 at respective proximal ends of the respective arm portions 121-125. In the example of FIG. 1, some or all of the motion mechanisms 131-135 (e.g., rotary joints with corresponding motors) may enable motion (e.g., rotation) of the respective arm portions 121-125 (e.g., about respective rotary axes RA1-RA5). In various implementations, the position sensors SEN1-SEN5 (e.g., rotary encoders) may be utilized for determining the positions (e.g., angular orientations) of the respective arm portions 121-125.

In various implementations, the movable configuration MAC may have a portion that is designated as a terminal portion (e.g., the fifth arm portion 125). In the example configuration of FIG. 1, the end tool mounting configuration ETMC is located proximate to (e.g., located at) the distal end of the fifth arm portion 125 (e.g., designated as the terminal portion), which corresponds to a distal end of the movable configuration MAC. In various alternative implementations, a terminal portion of a movable configuration may be an element (e.g., a rotatable element, etc.) that is not an arm portion but for which at least part of the terminal portion corresponds to a distal end of the movable configuration where the end tool mounting configuration ETMC is located.

In various implementations, the end tool mounting configuration ETMC may include various elements for coupling and maintaining the end tool ETL proximate to the distal end of the movable configuration MAC. For example, in various implementations, the end tool mounting configuration ETMC may include an autojoint connection, a magnetic coupling portion and/or other coupling elements as are known in the art for mounting an end tool ETL to a corresponding element. The end tool mounting configuration ETMC may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and an end tool stylus ETST with a contact point CP (e.g., for contacting a surface of a workpiece WP). The fifth motion mechanism 135 is located proximate to the distal end of the fourth arm portion 124. In various implementations, the fifth motion mechanism 135 (e.g., a rotary joint with a corresponding motor) may be configured to rotate the fifth arm portion 125 about a rotary axis RA5. In some implementations, the fifth motion mechanism 135 may also or alternatively include a different type of motion mechanism (e.g., a linear actuator) that is configured to move the fifth arm portion 125 linearly (e.g., up and down). In any case, the end tool ETL is mounted to (e.g., coupled to) the end tool mounting configuration ETMC, and has a corresponding end tool position ETP with corresponding coordinates (e.g., x, y and z coordinates). In various implementations, the end tool position ETP may correspond to or be proximate to the position of the end tool mounting configuration ETMC (e.g., at or proximate to the distal end DE5 of the fifth arm portion 125, which may correspond to the distal end of the movable configuration MAC).

Figure 2:
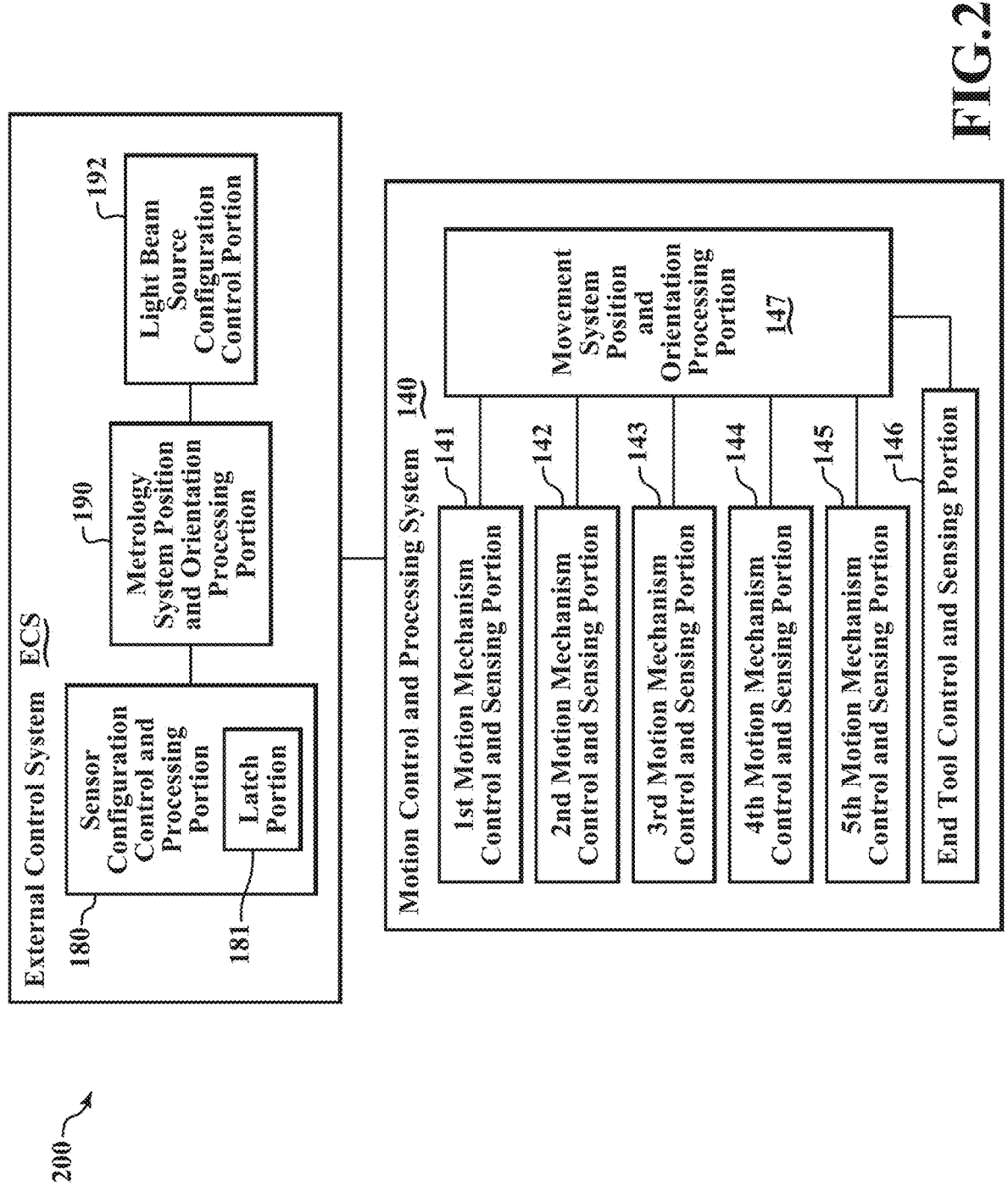
FIG. 2 is a block diagram of control and processing portions of the system of FIG. 1.

FIG. 2 is a block diagram of control and processing portions 200 of the system of FIG. 1, which include a motion control system 140 (e.g., which may also be a processing system) and which include at least portions of an external control system ECS. The motion control and processing system 140 is configured to control the end tool position ETP of the end tool ETL with a level of accuracy defined as a movement system accuracy. More specifically, the motion control and processing system 140 is generally configured to control the coordinates (e.g., x, y and z coordinates) of the end tool position ETP with the movement system accuracy based at least in part on utilizing the motion mechanisms 131-135 and position sensors SEN1-SEN5 for sensing and controlling the positions of the arm portions 121-125. In various implementations, the motion control and processing system 140 may include motion mechanism control and sensing portions 141-145 that may respectively receive signals from the respective position sensors SEN1-SEN5, for sensing the positions (e.g., angular positions, linear positions, etc.) of the respective arm portions 121-125, and/or may provide control signals to the respective motion mechanisms 131-135 (e.g., including motors, linear actuators, etc.) for moving the respective arm portions 121-125.

The motion control and processing system 140 may also receive signals from the end tool sensing portion ETSN. In various implementations, the end tool sensing portion ETSN may include circuitry and/or configurations related to the operations of the end tool ETL (e.g., for sensing a workpiece WP, etc.) As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN, which may provide corresponding signals to the motion control and processing system 140. In various implementations, the motion control and processing system 140 may include an end tool control and sensing portion 146 that may provide control signals to and/or receive sensing signals from the end tool sensing portion ETSN. In various implementations, the end tool control and sensing portion 146 and the end tool sensing portion ETSN may be merged and/or indistinguishable. In various implementations, the motion mechanism control and sensing portions 141-145 and the end tool control and sensing portion 146 may all provide outputs to and/or receive control signals from a movement system position and orientation processing portion 147 which may control and/or determine the overall positioning and orientation of the movable configuration MAC of the movement system 110 and corresponding position and orientation of the end tool ETL as part of the motion control and processing system 140. In various implementations, the position of the end tool ETL may be referenced as the end tool position ETP. In general, the motion control system 140 is configured to control the end tool position and orientation, based at least in part on controlling the movable configuration MAC so as to move at least a portion of the end tool ETL that is mounted to the end tool mounting configuration ETMC within a movement volume MV.

In various implementations, the metrology system 150 may be included with or otherwise added to a movement system 110 (e.g., as part of a retrofit configuration for being added to an existing movement system 110, etc.). In general, the metrology system 150 may be utilized to provide a determination of the position and orientation of the end tool ETL (e.g., with an improved level of accuracy relative to the accuracy of the movement system 110). More specifically, as will be described in more detail below, the metrology system 150 may be utilized to determine a relative position that is indicative of the metrology position coordinates of the end tool position ETP and an orientation of the end tool ETL, with an accuracy level that is better than the movement system accuracy.

In various implementations, the sensor configuration 160 of the metrology system 150 includes light beam sensors S1-S4. In FIG. 1, the light beam sensors S1 and S2 are shown on the far left and right in the illustrated cross-sectional view, respectively, and the general positions of the light beam sensors S3 and S4 (e.g., which would be located out of and into the page, respectively) are indicated by a dotted line representation. As will be described in more detail below, FIG. 4A illustrates a three dimensional view of a sensor configuration 160-4A with four light beam sensors and a similar structure as the sensor configuration 160 of FIG. 1.

The light beam sensors S1-S4 are located at fixed positions (e.g., as may each be located on a frame, wall or other structure, etc.) which at least in part define a metrology frame volume MFV. The metrology frame volume MFV is configured to be located around at least part of the movement volume MV (e.g., in which the at least part of the end tool ETL is moved by the movement system 110). The light beam source configuration LC is configured to be operated (e.g., by a light beam source configuration control portion 192) to direct light beams to the light beam sensors S1-S4 of the sensor configuration 160 (e.g., to indicate a position and orientation of the light beam source configuration LC).

The light beam source configuration LC is configured to be coupled to at least one of the end tool ETL or the end tool mounting configuration ETMC. It will be appreciated that when the end tool ETL is coupled to the end tool mounting configuration ETMC, the light beam source configuration LC is then coupled to both the end tool ETL and the end tool mounting configuration ETMC. The position and orientation of the light beam source configuration LC are indicative of the position and orientation of the end tool ETL. As will be described in more detail below with respect to FIGS. 5A-5H, the light beams that are directed to the light beam sensors S1-S4 are configured to produce measurement spots SP in positions on the light beam sensors that cause the light beam sensors to produce corresponding measurement signals. The metrology system position and orientation processing portion 190 is configured to process the measurement signals from the light beam sensors S1-S4 of the sensor configuration 160, wherein the measurement signals from the light beam sensors S1-S4 indicate the position and orientation of the light beam source configuration LC, and correspondingly of the end tool ETL.

In various implementations, the movement volume MV consists of a volume in which at least a portion of at least one of the end tool ETL and/or the light beam source configuration LC may be moved. In the example of FIG. 1, the movement volume MV is illustrated as including a volume in which the contact point CP of the end tool ETL may be moved when inspecting a workpiece. As one alternative example, a movement volume may alternatively include a volume in which the light beam source configuration LC may move when the end tool ETL is moved for inspecting a workpiece. In various implementations, the movement system 110 is configured to move the movable configuration MAC so as to move at least a portion of an end tool ETL (e.g., including the contact point CP) that is mounted to the end tool mounting configuration ETMC along at least two dimensions (e.g., x and y dimensions) in the movement volume MV. In the example of FIG. 1, the portion of the end tool ETL (e.g., the contact point CP) is movable by the movement system 110 along three dimensions (e.g., x, y and z dimensions).

In various implementations, a latch portion 181 and/or the metrology system position and orientation processing portion 190 and/or the light beam source configuration control portion 192 may be included as part of an external control system ECS (e.g., as part of an external computer, etc.) The light beam source configuration control portion 192 may provide power and/or control signals to the light beam source configuration LC and/or portions thereof (e.g., to one or more light beam sources of the light beam source configuration LC, etc.) The latch portion 181 may be included as part of a sensor configuration control and processing portion 180 (e.g., which may provide power and/or receive measurement signals from and/or provide control signals to the light beam sensors S1-S4 of the sensor configuration 160, and which may provide such signals and/or other signals to and from the metrology system position and orientation processing portion 190).

In various implementations, the latch portion 181 is configured to input at least one input signal that is related to the end tool position ETP and to determine the timing of a trigger signal based on the at least one input signal, and to output the trigger signal to at least one of the metrology system position and orientation processing portion 190 or the light beam sensors S1-S4 of the sensor configuration 160. In various implementations, the metrology system position and orientation processing portion 190 and/or the sensor configuration 160 are configured to determine current measurement signals from the light beam sensors S1-S4 (e.g., as corresponding to a current position and orientation of the light beam source configuration LC and/or end tool ETL) in response to receiving the trigger signal. In various implementations, the metrology system position and orientation processing portion 190 is configured to process the measurement signals as corresponding to the timing of the trigger signal to determine a position and orientation of the light beam source configuration LC and/or end tool ETL at the time of the trigger signal.

In various implementations, once a position and orientation of the light beam source configuration LC is determined, the position and orientation of the end tool may correspondingly be determined (e.g., in accordance with known geometric relationships, relative positioning, offsets etc. between the light beam source configuration LC and the end tool ETL). In various implementations, the light beam source configuration LC may be directly attached to the end tool ETL, or attached at or very close to the end tool mounting configuration (e.g., such that there is minimal or no separation between the end tool ETL and the light beam source configuration LC). In the implementation of FIG. 1, the light beam source configuration LC is illustrated as being at, or at least proximate to, the end tool position ETP (e.g., a designated reference position for the end tool ETL). Such configurations may reduce the complexity and/or otherwise improve the accuracy of a determination of the position and orientation of the end tool ETL as calculated in relation to a determined position and orientation of the light beam source configuration LC.

In various implementations, the determination of the position and orientation of the end tool ETL may further be utilized for determining certain additional position information (e.g., for determining the position of the contact point CP). As noted above, in various implementations, measurements of a workpiece surface may be determined by touching a contact point CP of an end tool ETL to a workpiece surface. In relation to such measurements, both the position and orientation of the end tool ETL may be determined, which may correspondingly indicate the position of the contact point CP.

In various implementations, different types of end tools ETL may provide different types of outputs that may be utilized with respect to the latch portion 181. For example, in an implementation where the end tool ETL is a touch probe that is used for measuring a workpiece and that outputs a touch signal when it touches the workpiece (e.g., when the contact point CP contacts the workpiece), the latch portion 181 may be configured to input that touch signal or a signal derived therefrom as the at least one input signal that the timing of a trigger signal is determined based on. In various implementations where the end tool ETL is a touch probe, a central axis of the touch probe may correspond to an end tool axis EA. As another example, in an implementation where the end tool ETL is a scanning probe that is used for measuring a workpiece and that provides respective workpiece measurement sample data corresponding to a respective sample timing signal, the latch portion 181 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the latch portion 181 may be configured to input that workpiece image acquisition signal or a signal derived therefrom as the at least one input signal.

In various implementations, the metrology system 150 may be configured to determine the position and orientation of the light beam source configuration and/or end tool ETL, based on the measurement signals from the light beam sensors S1-S4 of the sensor configuration 160. It will be appreciated that such a system may have certain advantages over various alternative systems. For example, in various implementations a system such as that disclosed herein may be smaller and/or less expensive and/or more accurate than certain alternative systems utilizing alternative technologies (e.g., including certain photogrammetry systems, etc.) as may alternatively be utilized for tracking movement system positions and orientations. The disclosed system also does not take up or obscure any part of the movement volume MV, such as alternative systems that may include a scale or fiducial on the ground or stage, or otherwise in the same area (e.g., in the movement volume MV) where workpieces may otherwise be worked on and/or inspected, etc.

In various implementations, a comparison between a photogrammetry system and the metrology system 150 as disclosed herein may be described as follows. A photogrammetry system may utilize incoherent light sources, for which cameras are utilized to image the light sources, for determining the positions. In some instances, position and angle may be calculated from the light source positions. The effective 'lever arm' for determining the angle is the distances between the light sources. This is difficult to increase as it necessarily also increases the counteractive lever arm between the light source and the lower portion of the end tool (e.g., corresponding to a distance, such as along an end tool axis EA direction, between the light source and the contact point CP of the end tool). In other words, photogrammetry configurations which attempt to make it easier to measure the probe angle, also make the end tool position more sensitive to this angle. The camera's field of view in such systems may be the entire working volume, corresponding to a low magnification.

In contrast, in the metrology system 150 as disclosed herein, coherent light sources may typically be utilized. For example, the light sources for the light beam source configuration LC may be coherent light sources (e.g., laser light sources), for which the light beams may be coherent light beams (e.g., laser beams). Diffractive optical elements (e.g., as will be described in more detail below with respect to FIG. 3) may be utilized to produce many diffracted light beams (e.g., which can be dispersed in many directions surrounding the light source configuration LC). In various implementations, a relatively small fraction of the many diffracted or otherwise provided light beams may be directed to or otherwise received by the distributed light beam sensors of the metrology system 150 (e.g., to produce corresponding measurement spots SP on the light beam sensors). In various implementations, the light beam sensors may be various types of cameras and/or two dimensional position sensitive sensors (e.g., lensless cameras, position sensitive detectors, optical position sensors that can measure a position of a light spot in two-dimensions on a sensor surface, etc.) In operation, the large lever arms (e.g., corresponding in part to the distances between the light beam source configuration LC and the light beam sensors S) enable highly accurate orientation (e.g., corresponding to an angle of an end tool, etc.) measurements/determinations. In addition, the effective magnifications for such operations may be relatively high.

In various implementations, measurement signals from the light beam sensors (e.g., corresponding to images and/or indicating two dimensional positions of measurement spots SP formed by the light beams, for which a centroid of each measurement spot may be calculated/determined in terms of XYZ coordinates) may be utilized in combination with the known characteristics of the light beam source configuration LC (e.g., including laser projection based on the known geometric relationships of the light beams including the relative three dimensional angles of each light beam and accounting for any offsets of each light beam at its source, etc.) to calculate/determine the position and orientation (e.g., as based on using nonlinear least squares and/or other processing/calculation techniques). Stated another way, the known vectors of the light beams may be fit to the known locations (e.g., in XYZ coordinates) that they intersect on the light beam sensors (e.g., in terms of the positions of the measurement spots SP) to determine the position and orientation of the light beam source configuration LC. In various implementations, the measurement spots SP on the light beam sensors may each be uniquely identified (e.g., in part by utilizing coarse position information determined from the movement system 110, and/or based on unique or otherwise identifiable characteristics of the light beams, such as unique pattern information of the light beams, such as a pseudo-random pattern with unique or otherwise identifiable portions, etc.)

It will be appreciated that the combination of such features and characteristics of the metrology system 150 may result in higher accuracy position and orientation determinations than those provided by a photogrammetry system such as that described above. As some particular advantages, it is noted that the light beams as utilized in the metrology system 150 have corresponding orientation information that is lacking in photogrammetry and is more sensitive to the orientation (e.g., of the light beam source configuration LC and the end tool ETL). This can increase accuracy by a large amount.

Figure 3:
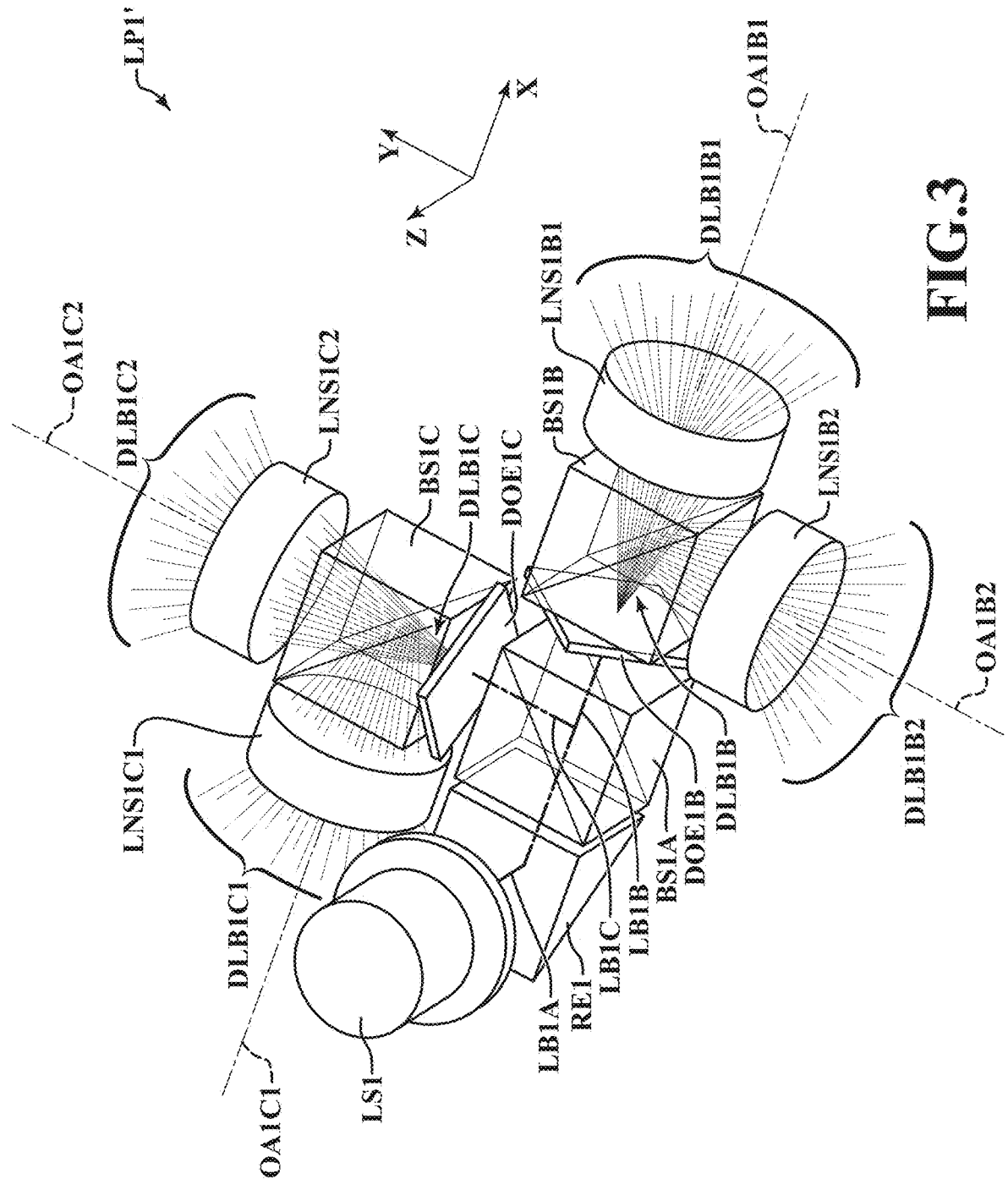
FIG. 3 is a diagram of a first exemplary implementation of a light beam source portion of a light beam source configuration such as may be utilized in the system of FIG. 1.

FIG. 3 is a diagram of a first exemplary implementation of a light beam source portion LP1' of a light beam source configuration LC (e.g., such as may be similar to the light beam source configuration LC utilized in the system of FIG. 1). As illustrated in FIG. 3, the light beam source portion LP1' includes a light source LS1, a reflective element RE1, beamsplitters BS1A, BS1B, BS1C, diffractive optical elements DOE1B, DOE1C, and lenses LNS1B1, LNS1B2, LNS1C1 and LNS1C2. In various implementations, the light source LS1 may be a laser source, for which at least some or all of the light beams in the following description may be laser beams. The light source LS1 produces a light beam LB1A, which is reflected by reflective element RE1 to be directed toward the beamsplitter BS1A, which splits the light beam into light beams LB1B and LB1C, which are directed to the diffractive optical elements DOE1B and DOE1C, respectively.

The light beam LB1B is diffracted by the diffractive optical element DOE1B into diffracted light beams DLB1B, which are split by beamsplitter BS1B into diffracted light beams DLB1B1 and DLB1B2. The diffracted light beams DLB1B1 further diverge after passing through the lens LNS1B1, which has an optical axis OA1B1, and the diffracted light beams DLB1B2 further diverge after passing through the lens LNS1B2, which has an optical axis OA1B2. Similarly, the light beam LB1C is diffracted by the diffractive optical element DOE1C into diffracted light beams DLB1C, which are split by beamsplitter BS1C into diffracted light beams DLB1C1 and DLB1C2. The diffracted light beams DLB1C1 further diverge after passing through the lens LNS1C1 which has an optical axis OA1C1, and the diffracted light beams DLB1C2 further diverge after passing through the lens LNS1C2, which has an optical axis OA1C2.

Orthogonal X, Y and Z axes are indicated (e.g., as corresponding to a coordinate system for the light beam source portion LP1' and/or light beam source configuration). The optical axes OA1B1 and OA1C1 are indicated to be parallel to the X-axis, and the optical axes OA1B2 and OA1C2 are indicated to be parallel to the Y-axis.

In various implementations, the light beam source portion LP1' may be a first light beam source portion, for which the corresponding light beam source configuration may include additional light beam source portions. For example, the light beam source configuration may include second and third light beam source portions (e.g., in some instances each having identical components as the first light beam source portion LP1'). In such a configuration, for the second light beam source portion, the respective optical axes may be parallel to the X-axis and the Z-axis, and for the third light beam source portion, the respective optical axes may be parallel to the Y-axis and the Z-axis. In such a configuration, there may thus be an approximately equal number of diffracted light beams directed by lenses with optical axes in the X-axis, Y-axis and Z-axis directions. Such a configuration may result in a relatively even distribution of light beams in directions from the light beam source configuration. In one implementation, if such a light beam source configuration were placed at a center of a sphere, there may be an approximately even dispersion around the surface of the sphere of intersection points where the light beams intersect with the surface of the sphere. In various implementations, it may be desirable for a light beam source configuration LC to provide at least a minimum number of light beams as dispersed in the directions surrounding the light beam source configuration LC (e.g., such as at least 10,000 light beams, or at least 100,000 light beams, etc.). In various implementations, a desired minimum number of light beams may depend on the light beam source configuration LC/light beam sensor distance, the number and size of the light beam sensors and the range of possible light beam source configuration LC orientations. In various implementations, it may be desirable for some or all of the light beams to have a similar or an approximately equal angular spacing relative to one another.

In various implementations, each of the light beams (e.g., each of the diffracted light beams DLB in the example of FIG. 3) of a light beam source configuration may have certain known and/or determined characteristics (e.g., relative angular orientations, source points of origin, etc.) which spatially relate each light beam to the light beam source configuration. Such characteristics enable a position and orientation of the light beam source configuration to be determined, based at least in part on the light beams that are directed to and sensed by the light beam sensors of the sensor configuration. With regard to the light beam source portion LP1', it is noted that the diffracted light beams may have certain offsets in relation to one another. For example, the diffracted light beams DLB1B1 may be modeled/regarded/designated as having a source point of origin that is offset along the Y-axis direction from a modeled/regarded/designated source point of origin for the diffracted light beams DLB1C1 (e.g., as related to the offset along the Y-axis direction between the lenses LNS1B1 and LNS1C1). It will be appreciated that such offsets may be included and/or otherwise accounted for in position calculations (e.g., including the processing/calculations as performed by the metrology system position and orientation processing portion 190 for processing the measurement signals from the light beam sensors to determine the position and orientation of the light beam source configuration LC and/or end tool ETL, etc.) Once a position and orientation of the light beam source configuration LC is determined, any known geometric relationships and/or relative positioning/offsets between the light beam source configuration LC and the end tool ETL may also be utilized for determining the position and orientation of the end tool ETL. As will be described in more detail below, FIGS. 5A-5H illustrate certain simplified examples regarding light beams B of a light beam source configuration LC as directed to sensors of a sensor configuration 160, and as corresponding to certain positions and orientations of a light beam source configuration LC.

Figure 4B:
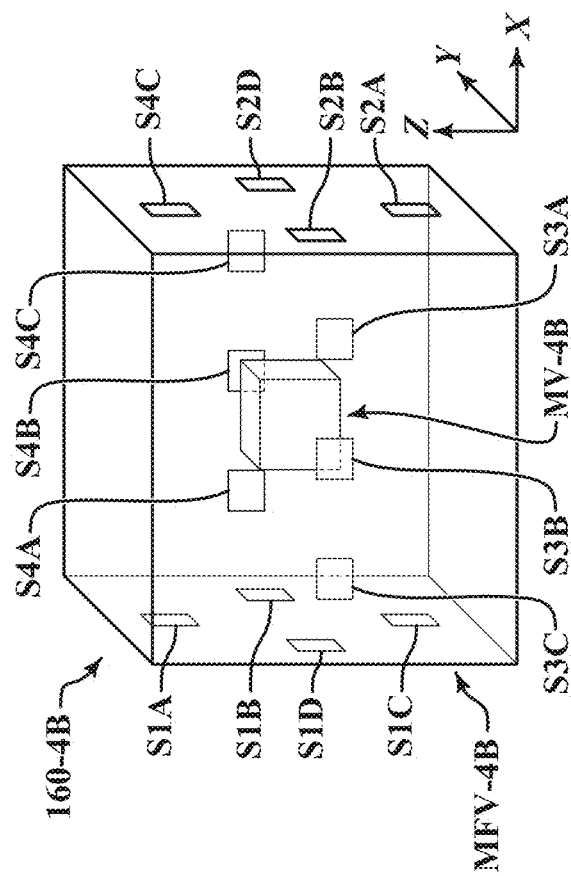
FIGS. 4A and 4B are diagrams of respective movement volumes as surrounded by respective metrology frame volumes which are defined at least in part by respective sensor configurations.
Figure 4A:
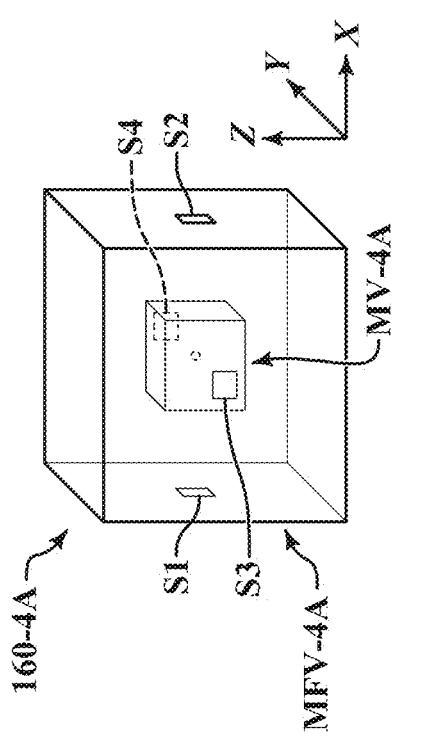

FIGS. 4A and 4B are diagrams of respective movement volumes MV-4A and MV-4B as surrounded by respective metrology frame volumes MFV-4A and MFV-4B which are defined at least in part by respective sensor configurations 160-4A and 160-4B, which each include a respective different number of light beam sensors. In each case, the movement volume MV and metrology frame volume MFV are both represented as cubical volumes with the edges and sides parallel to the orthogonal X, Y, Z axis directions. It will be appreciated that while for simplicity of the illustrations the volumes and other aspects are shown with certain relative dimensions, that in various implementations the relative dimensions of the volumes and other aspects may vary (e.g., the illustrated dimensions may not be to scale, and for which the movement volumes MV may be larger in relation to the metrology frame volumes MFV, etc.)

FIG. 4A illustrates an implementation with a sensor configuration 160-4A including four light beam sensors S1-S4 (e.g., similar to the example implementation illustrated in FIG. 1, and also in relation to the examples of FIGS. 5A-5H, as will be described in more detail below). The four light beam sensors S1-S4 are disposed at positions that are all at a common middle Z-height along a Z-axis direction (i.e., all having a same Z-axis coordinate value). The light beam sensors S1 and S2 are disposed on opposite sides of the metrology frame volume and are parallel to a YZ plane. The light beam sensors S3 and S4 are disposed on opposite sides of the metrology frame volume and are parallel to an XZ plane.

FIG. 4B illustrates an implementation with a sensor configuration 160-4B including fourteen light beam sensors S1A-S1D, S2A-S2D, S3A-S3C and S4A-S4C. In relation to the sensor configuration 160-4A of FIG. 4A, the sensor configuration 160-4B of FIG. 4B may have higher measurement resolution and/or higher measurement accuracy along the X-axis direction (e.g., in accordance with the sets of three light beam sensors S3A-S3C, and S4A-S4C, as disposed at different positions along the X-axis direction on each respective side of the metrology frame volume MFV-4B). In addition, in further comparison to the sensor configuration of FIGS. 4A, the sensor configuration 160-4B of FIG. 4B may have higher measurement resolution and/or higher measurement accuracy along the Y-axis direction (e.g., in accordance with the sets of two light beam sensors S1B and S1D, and S2B and S2D, as disposed at different positions along the Y-axis direction on each respective side of the metrology frame volume MFV-4B, and as compared to the configuration of FIG. 4A with the utilization of the single light beam sensors S1 and S2 on each respective side). Furthermore, also in comparison to the sensor configuration of FIG. 4A, the sensor configuration 160-4B of FIG. 4B may also have higher measurement resolution and/or higher measurement accuracy along the Z-axis direction (e.g., in accordance with the sets of two light beam sensors S1A and S1C, and S2A and S2C, as disposed at different positions along the Z-axis direction on each respective side of the metrology frame volume MFV-4B, and as compared to the configuration of FIG. 4A with the utilization of the single light beam sensors S1 and S2 on each respective side).

FIGS. 5A-5H are diagrams illustrating a light beam source configuration LC' that directs four example light beams B1-B4 toward four light beam sensors S1-S4 of a sensor configuration 160' and which produce four corresponding measurement spots SP1-SP4 for different positions and orientations of the light beam source configuration LC'.

In various implementations, the sensor configuration 160' may be similar to that of FIGS. 1 and 4A (e.g., with the four light beam sensors S1-S4 at least partly defining a corresponding cubical metrology frame volume MFV). FIGS. 5A-5H illustrate respective top views 510A-510H, cross-section front views 520A-520H, cross-section side views 530A-530H, and positions of measurements spots views 540A-540H (i.e., in accordance with a front view of the sensor surface of each of the respective light beam sensors S1-S4).

In various implementations, the examples of FIGS. 5A-5H may also be illustrative of operations of sensor configurations with a greater number of light beam sensors, for which the following described examples may be illustrative of the operations of four (e.g., the four most central light beam sensors, etc.) out of the total number of light beam sensors in the given configurations. The examples of FIGS. 5A-5H may also be illustrative of operations of light beam source configurations with a greater number of light beams (e.g., 10's, 100's, or 1000's, etc. of light beams, such as may in some instances be directed in relatively evenly distributed three dimensional directions, such as described above with respect to FIG. 3). In regard to such implementations, the following described examples may be illustrative of the operations of four (e.g., the four most central light beams and/or the four light beams specifically oriented along the X and Y axis directions, etc.) out of the total number of light beams in the given configurations. It will also be appreciated with respect to the examples of FIGS. 5A-5H, that the relative sizes of the light beam sensors S1-S4 appear exaggerated, the relative distances between the light beam sensors appear reduced, and that no offsets are indicated between the source points for the different light beams B1-B4, for purposes of simplifying the illustrated examples.

Figure 5A:
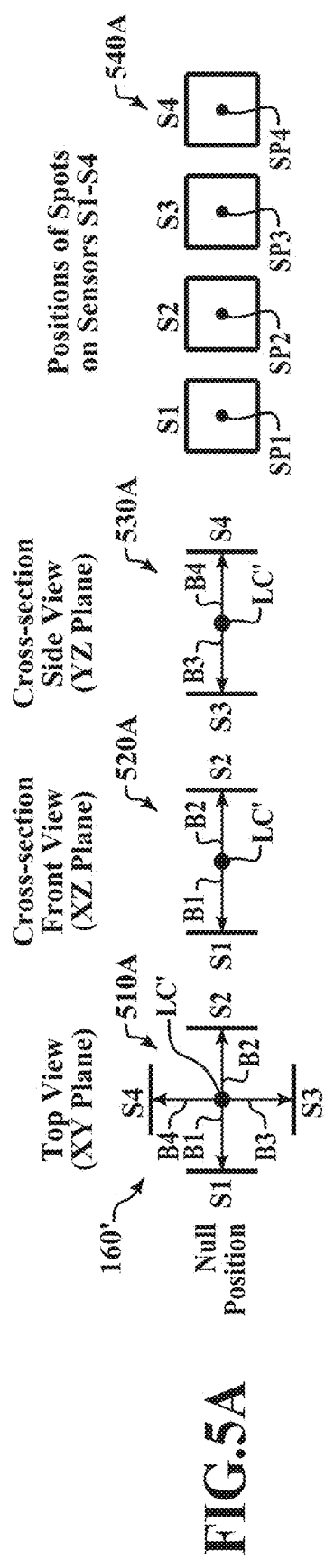

In the example of FIG. 5A, the light beam source configuration LC', and the corresponding light beams B1-B4, are illustrated as being in a designated "null" position (e.g., including a corresponding "null" orientation). More specifically, the light beams B1 and B2 are each parallel to the X-axis direction, and are each directed to the centers of the light beam sensors S1 and S2, respectively. Similarly, the light beams B3 and B4 are each parallel to the Y-axis direction, and are each directed to the centers of the light beam sensors S3 and S4, respectively. The light beams B1-B4 produce corresponding measurement spots SP1-SP4 in the centers of each of the light beam sensors S1-S4, respectively. In various implementations, the light beam sensors S1-S4 may be various types of cameras and/or two dimensional position sensitive sensors (e.g., optical position sensors that can measure a position of a measurement spot, such as formed by a light beam, in two-dimensions on a sensor surface).

The light beam sensors S1-S4 may output measurement signals that indicate that the measurement spots SP1-SP4 are in the centers of the light beam sensors S1-S4. Given the known geometric relationships between the light beams B1-B4 and the light beam source configuration LC', the measurement signals from the light beam sensors S1-S4 indicate the position and orientation of the light beam source configuration LC' (e.g., as corresponding to the position and orientation of the example of FIG. 5A). The measurement signals may be processed (e.g., by a processing portion 190), for which the processing may determine the position and orientation of the light beam source configuration LC' and/or an end tool ETL to which the light beam source configuration LC' is coupled (e.g., see FIG. 1), etc.

Figure 5B:
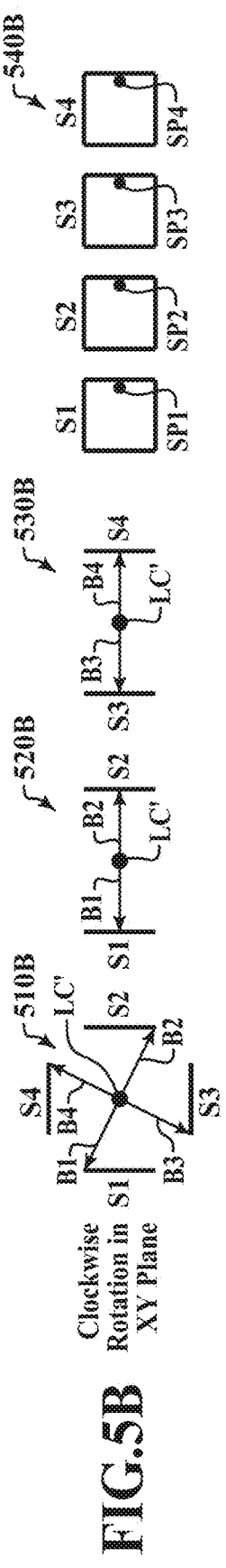

In the example of FIG. 5B (e.g., in comparison to the example of FIG. 5A), the light beam source configuration LC' is illustrated as having been rotated clockwise in an XY plane. The view 510B (i.e., of the XY plane) illustrates the clockwise rotation and indicates the different positions of the light beams B1-B4 on the light beam sensors S1-S4. The view 540B illustrates the positions of the measurement spots SP1-SP4 on the light beam sensors S1-S4, as produced by the light beams B1-B4, respectively. More specifically, the measurement spots SP1-SP4 are shown to each have moved to the middle right of each of the light beam sensors S1-S4, respectively.

Figure 5C:
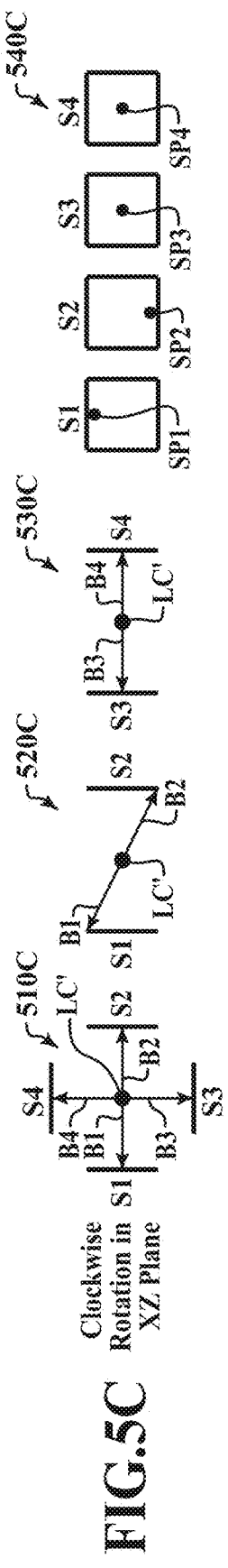

In the example of FIG. 5C (e.g., in comparison to the example of FIG. 5A), the light beam source configuration LC' is illustrated as having been rotated clockwise in an XZ plane. The view 520C (i.e., of the XZ plane) illustrates the clockwise rotation and indicates the different positions of the light beams B1 and B2 on the light beam sensors S1 and S2. In the view 540C, the measurement spots SP1 and SP2 are illustrated as having moved to the middle top and middle bottom, respectively, of the light beam sensors S1 and S2, while the measurement spots SP3 and SP4 have remained in the centers of the light beam sensors S3 and S4, respectively.

Figure 5D:
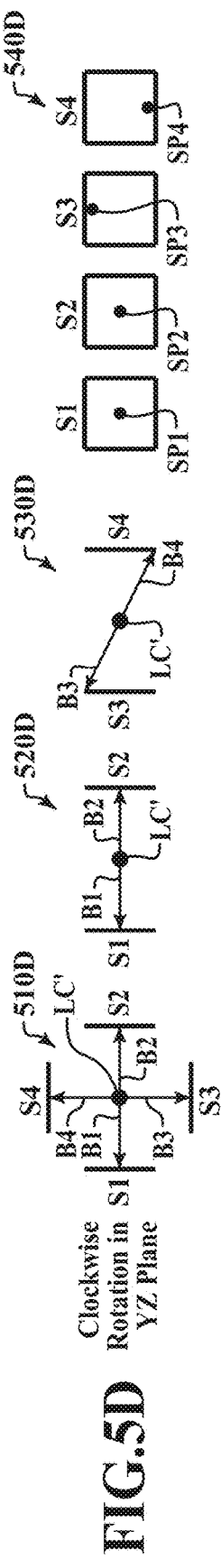

In the example of FIG. 5D (e.g., in comparison to the example of FIG. 5A), the light beam source configuration LC' is illustrated as having been rotated clockwise in a YZ plane. The view 530D (i.e., of the YZ plane) illustrates the clockwise rotation and indicates the different positions of the light beams B3 and B4 on the light beam sensors S3 and S4. In the view 540D, the measurement spots SP1 and SP2 have remained in the centers of the light beam sensors S1 and S2, respectively, while the measurement spots SP3 and SP4 are illustrated as having moved to the middle top and middle bottom, respectively, of the light beam sensors S3 and S4.

The examples of FIGS. 5B-5D are noted to each correspond at least to a change in orientation of the light beam source configuration LC'. In some implementations, the illustrated changes may not otherwise correspond to a change in position (e.g., depending on where a reference point is designated for the light beam source configuration LC', which changes in position are determined in relation to). In the examples of FIGS. 5A-5H, in various implementations a reference point for a light beam source configuration may be designated as being at a geometric center, or other center, of the light beam source configuration.

In the example of FIG. 5E (e.g., in comparison to the example of FIG. 5A), the light beam source configuration LC' is illustrated as having moved in the XY plane toward the light beam sensor S4. The view 510E (i.e., of the XY plane) illustrates the different positions of the light beams B1 and B2 on the light beam sensors S1 and S2. In the view 540E, the measurement spots SP1 and SP2 are illustrated as having moved to the middle right and middle left, respectively, of the light beam sensors S1 and S2, while the measurement spots SP3 and SP4 have remained in the centers of the light beam sensors S3 and S4, respectively.

In the example of FIG. 5F (e.g., in comparison to the example of FIG. 5A), the light beam source configuration LC' is illustrated as having moved in the XY plane toward the light beam sensor S1. The view 510F (i.e., of the XY plane) illustrates the different positions of the light beams B3 and B4 on the light beam sensors S3 and S4. In the view 540F, the measurement spots SP1 and SP2 have remained in the centers of the light beam sensors S1 and S2, respectively, while the measurement spots SP3 and SP4 are illustrated as having moved to the middle right and middle left, respectively, of the light beam sensors S3 and S4.

In the example of FIG. 5G (e.g., in comparison to the example of FIG. 5A), the light beam source configuration LC' is illustrated as having been moved up in the Z direction (i.e., parallel to the Z-axis). The views 520G and 530G (i.e., of the XZ plane and YZ plane, respectively) illustrate the different positions of the light beams B1 and B2 on the light beam sensors S1 and S2, respectively, and of the light beams B3 and B4 on the light beam sensors S3 and S4, respectively. In the view 540G, the measurement spots SP1-SP4 are illustrated as each having moved to the top center of the light beam sensors S1-S4, respectively.

In the example of FIG. 5H (e.g., in comparison to the example of FIG. 5A), the light beam source configuration LC' is illustrated as having been rotated clockwise in the XY plane and moved up in the Z direction (i.e., parallel to the Z-axis). The view 510H (i.e., of the XY plane) illustrates the clockwise rotation and the different positions of the light beams B1-B4 on the light beam sensors S1-S4. The views 520H and 530H (i.e., of the XZ plane and YZ plane, respectively) illustrate the different positions of the light beams B1 and B2 on the light beam sensors S1 and S2, respectively, and of the light beams B3 and B4 on the light beam sensors S3 and S4, respectively. In the view 540H, the measurement spots SP1-SP4 are illustrated as each having moved to the top right corner the light beam sensors S1-S4, respectively.

As described above, the light beam sensors S1-S4 may output measurement signals that indicate the positions of each of the measurement spots SP1-SP4 on the respective light beam sensors S1-S4. Given the known geometric relationships between the light beams B1-B4 and the light beam source configuration LC' (e.g., including the known angular orientations of the light beams B1-B4 as directed by and in relation to the light beam source configuration LC' and in relation to each other), the positions of the measurement spots SP1-SP4 on the light beam sensors S1-S4 indicate the position and orientation of the light beam source configuration LC' (e.g., as corresponding to the orientations in the examples of FIGS. 5A-5H). The measurement signals from the light beam sensors S1-S4 may be processed (e.g., by a processing portion 190), for which the processing may determine (e.g., at least in part utilizing the known geometric relationships, etc.) the position and orientation of the light beam source configuration LC' and/or an end tool ETL to which the light beam source configuration LC' is coupled (e.g., see FIG. 1), etc.

With respect to the measurement signals from the light beam sensors S1-S4 indicating the position and orientation of the light beam source configuration LC', it will be appreciated that the simplified examples of FIGS. 5A-5H are all with respect to the light beams B1-B4 each being directed to the respective light beam sensor S1-S4. More specifically, in each example, the light beam B1 is directed to the light beam sensor S1, the light beam B2 is directed to the light beam sensor S2, the light beam B3 is directed to the light beam sensor S3 and the light beam B4 is directed to the light beam sensor S4. In these examples, it will be appreciated that if the light beam source configuration LC' were rotated in the XY plane by 90 degrees, 180 degrees or 270 degrees, that similar measurement spots may be produced in similar locations on the light beam sensors S1-S4, for which it may be desirable to be able to disambiguate relative to (e.g., distinguish between) such possibilities.

For example, with respect to the orientation illustrated in FIG. 5A, and with the light beams B1-B4 each being directed to the respective light beam sensor S1-S4, it will be appreciated that the measurement signals indicating the that measurement spots SP1-SP4 are each in the centers of the respective light beam sensors S1-S4, respectively, uniquely indicate that the light beam source configuration LC' is in the position and orientation illustrated in the views 510A-530A of FIG. 5A (e.g., corresponding to a "null position" in the given example). However, with respect to the top view 510A, if the configuration were rotated clockwise by 90 degrees in the XY plane, measurement spots SP would similarly be produced in the centers of the light beam sensors S1-S4. More specifically, the light beam B1 would produce a measurement spot SP1 at the center of the light beam sensor S4, the light beam B2 would produce a measurement spot SP2 at the center of the light beam sensor S3, the light beam B3 would produce a measurement spot SP3 at the center of the light beam sensor S1, and the light beam B4 would produce a measurement spot SP4 at the center of the light beam sensor S2. It will be appreciated that similar measurement spots at the centers of the light beam sensors S1-S4 as produced by different respective measurement beams may occur for similar clockwise rotations of the configuration in the XY plane of 180 degrees and 270 degrees, with respect to the initial orientation as illustrated in the top view 510A.

In order to disambiguate between the sets of measurement signals that would result from such orientations (e.g., which might otherwise appear relatively identical), it may be desirable for the system to be configured to determine (e.g., at least approximately) which light beams are generally directed toward which light beam sensors. As one approach for addressing such issues, position information from the movement system 110 may be utilized for the disambiguation. For example, in relation to the measurement system 110 as described above with respect to FIGS. 1 and 2, the position information determined from the positions sensors SEN1-SEN5 (e.g., as received by the movement system position and orientation processing portion 147), may be utilized to determine a coarse position and orientation of the end tool ETL and/or of the light beam source configuration LC (e.g., with a movement system accuracy). While the movement system accuracy may be lower than that desired for certain applications, it may be useful for the disambiguation (e.g., such as described in relation to the above examples). More specifically, the movement system accuracy may be able to provide coarse position information (e.g., indicating the coarse position and orientation of the end tool ETL and/or of the light beam source configuration LC), which may be utilized to determine which light beams are generally directed toward which light beam sensors.

Returning to the above examples, in an instance with the configuration of FIG. 5A where the measurement signals from the light beam sensors S1-S4 indicate that the measurement spots are all in the centers of the light beam sensors, the position and orientation information from the movement system may be utilized to disambiguate the possibilities for the orientation of the light beam source configuration LC' (e.g., between being a 0 degree rotation as illustrated in FIG. 5A, or a 90 degree rotation, or a 180 degree rotation, or a 270 degree rotation). For example, the position and orientation information from the movement system 110 may be utilized to determine whether the measurement spot that is at the center of the light beam sensor S1 is produced by the light beam B1, B2, B3 or B4. As noted above, while the measurement system accuracy may be relatively low, it may effectively be utilized by the metrology system for disambiguating possibilities such as those described above (in accordance with the coarse position information provided by the movement system), and for which the metrology system may then effectively provide higher accuracy measurements in accordance with the processes such as those described herein.

In various implementations, a general characterization of the relationship between the measurement signals of the movement system 110 and the measurement signals of the metrology system 150 may be described as follows. The position and orientation information (e.g., including measurements) determined from one or more of the position sensors SEN1-SEN5 of the movement system 110 (i.e., with the movement system accuracy) may be characterized as providing relatively coarse scale information (e.g., including coarse scale measurements of position and orientation, etc.) The position and orientation information (e.g., including measurements) determined from the metrology system 150 (e.g., as based on measurement signals from the light beam sensors) may be characterized as providing relatively fine scale information (e.g., including fine scale measurements of position and orientation, etc.) In various implementations, the measurements of the two systems may be combined to provide high accuracy measurements over a relatively large non-ambiguity range (e.g., such as micron level accuracy over a cubed meter movement volume).

As some specific example values, in one example implementation the movement system may have a positioning accuracy/potential position error of approximately 100 microns (e.g., with a non-ambiguity range provided over a 1 meter cubed movement/measurement volume as a coarse scale range). In this example, the metrology system may be configured to be able to resolve a potential distance error of the coarse scale measurement, such as with a non-ambiguity range that is larger than the potential distance error (e.g., a non-ambiguity range larger than 100 microns in this example, and with micron level accuracy, as a fine scale range). In accordance with such example values, the measurements (e.g., position and orientation information) of the two systems may be combined, to provide high accuracy measurements (e.g., with the micron level accuracy over the 1 meter cubed movement volume).

In regard to a metrology system such as that disclosed herein, such principles may also be generally described in terms of identifying/disambiguating which light beams of a light beam source configuration are directed to which light beam sensors (e.g., for a given measurement spot on a light beam sensor). In relation to the above example values, the positioning accuracy/potential position error of approximately 100 microns of the movement system (e.g., with a non-ambiguity range provided over a 1 meter cubed movement/measurement volume as a coarse scale range), may be sufficient for identifying/determining/disambiguating which light beams are directed to which light beam sensors. The non-ambiguity range of the metrology system (e.g., which is larger than 100 microns in the above example, and with micron level accuracy, as a fine scale range), may correspond to a range over which different positions and orientations of the light beam source configuration can be unambiguously determined (e.g., in accordance with measurement spots moving across or otherwise being in different respective positions on the light beam sensors, such as illustrated in part by the simplified examples of FIGS. 5A-5H).

As an alternative and/or in addition to the above noted implementations (e.g., in which position information from a movement system is utilized for disambiguation), the light beams may also or alternatively have certain characteristics which may be utilized for disambiguation (e.g., which enable determinations of which light beams are directed toward which light beam sensors). For example, the light beams may be arranged in a pattern (e.g., with unique portions). In various implementations, the light beams may also or alternatively have different wavelengths (e.g., colors), timings, modulation, structures, and/or other characteristics that may be sensed/identified and utilized to determine which light beams are directed to which light beam sensors (e.g., for which the light beam sensors may also have certain corresponding differentiation capabilities, such as including different color detectors, etc.) In various implementations, one or more of the characteristics (e.g., timing, modulation, etc.) of the light beams may be controlled by a light beam source configuration control portion 192 (e.g., see FIG. 2), which may provide associated signals (e.g., timing signals, etc.) to a sensor configuration control and processing portion 180 and/or a metrology system position and orientation processing portion 190 (e.g., to be utilized as part of the processing for receiving measurement signals from the light beam sensors and utilizing the measurement signals for determining which light beams are directed toward which light beam sensors).

Figure 6A:
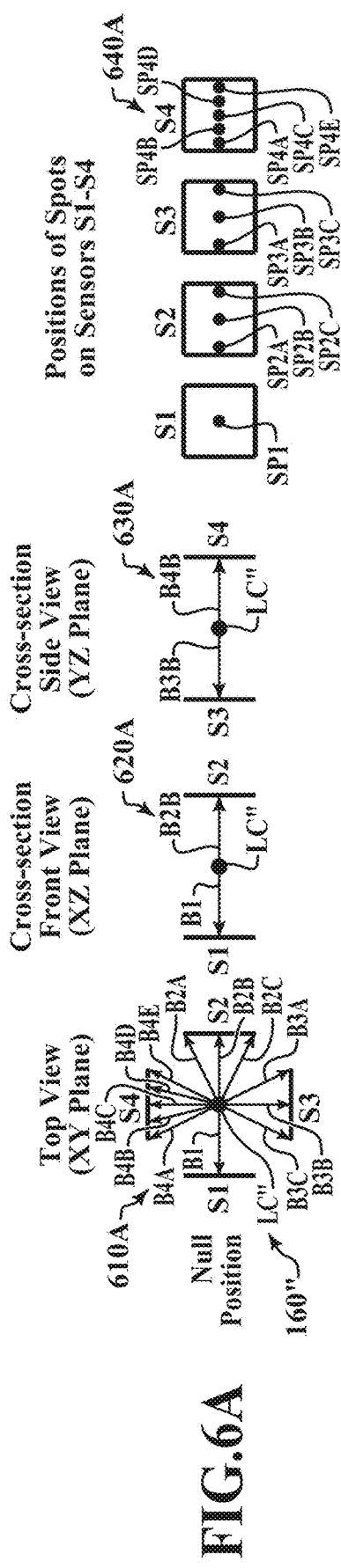
FIGS. 6A-6C are diagrams illustrating twelve example light beams of a light beam source configuration and corresponding measurement spots on four sensors of a sensor configuration for different positions and orientations of the light beam source configuration.
Figure 6B:
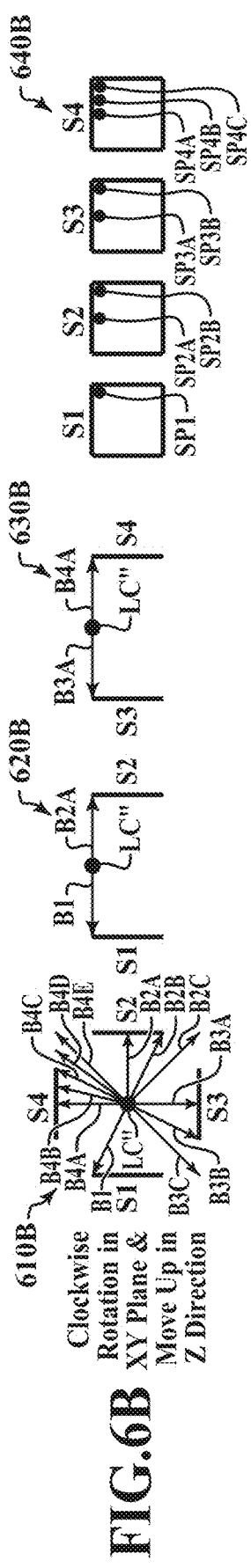
Figure 6C:
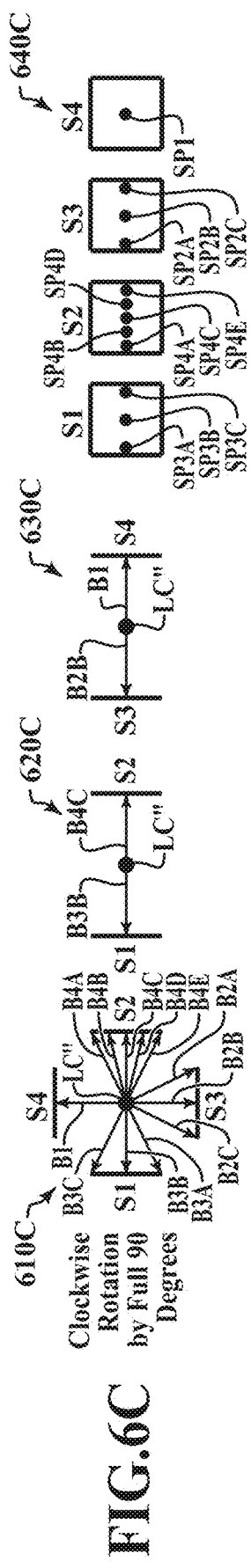

FIGS. 6A-6C are diagrams illustrating twelve example light beams B of a light beam source configuration LC" and corresponding measurement spots SP on four sensors S1-S4 of a sensor configuration 160" for different positions and orientations of the light beam source configuration LC". More specifically, in various implementations the light beam source configuration LC" provides and directs light beams B1, B2A-B2C, B3A-B3C and B4A-B4E to form corresponding measurement spots SP1, SP2A-SP2C, SP3A-SP3C and SP4A-SP4E on the light beam sensors S1-S4. It will be appreciated that in the examples of FIGS. 6A-6C, the light beams are arranged in a pattern (e.g., which in the orientation of FIG. 6A results in the single light beam B1 directed toward the light beam sensor S1, the three light beams B2A-B2C directed toward the light beam sensor S2, the three light beams B3A-B3C directed toward the light beam sensor S3, and the five light beams B4A-B4E directed toward the light beam sensor S4). It is noted that such patterns may include different spacings and orientations (e.g., angular spacings and orientations) between the light beams and/or other characteristics that may enable a portion of the pattern as directed to a light beam sensor or group of light beam sensors to be uniquely identified (e.g., for use in determining/disambiguating the orientation and/or position of the light beam sensor configuration, etc.)

In the example of FIG. 6A (with certain similarities to the orientation illustrated in FIG. 5A), the light beam source configuration LC", and the corresponding light beams B1, B2A-B2C, B3A-B3C and B4A-B4E, are illustrated as being in a designated "null" position (e.g., including a corresponding "null" orientation). More specifically, the light beam B1 and the central light beam B2B are each parallel to the X-axis direction, and are each directed to the centers of the light beam sensors S1 and S2, respectively. Similarly, the central light beams B3B and B4C are each parallel to the Y-axis direction, and are each directed to the centers of the light beam sensors S3 and S4, respectively.

In the orientation illustrated in FIG. 6A, the light beams B1, B2A-B2C, B3A-B3C and B4A-B4E produce corresponding measurement spots SP1, SP2A-SP2C, SP3A-SP3C and SP4A-SP4E on the light beam sensors S1-S4, respectively. As illustrated in the view 640A, the measurement spots SP1, SP2B, SP3B and SP4C are all in the centers of the light beam sensors S1, S2, S3 and S4, respectively. These measurement spot positions are noted to be similar to the measurement spot positions illustrated in FIG. 5A.

However, unlike FIG. 5A where only single measurement spots are produced on each light beam sensor, in FIG. 6A, different numbers and/or arrangements of measurement spots are formed on different light beam sensors, in accordance with the pattern of light beams that are provided and directed by the light beam source configuration LC".

For example, while the light beam B1 produces only the single measurement spot SP1 at the center of the light beam sensor S1, the light beams B2A-B2C and B3A-B3C each produce a row of three measurement spots SP2A-SP2C and SP3A-SP3C across the middles of the light beam sensors S2 and S3, respectively. In addition, the light beams B4A-B4E produce a row of five measurement spots SP4A-SP4E across the middle of the light beam sensor S4. It will be appreciated that such characteristics may enable a determination of which light beams are directed to which light beam sensors (e.g., for enabling disambiguation in regard to the issues such as those described above), and for which additional position information (e.g., from a movement system) may not be required (e.g., although in some implementations may also be utilized in addition to such patterns or other information).

The light beam sensors S1-S4 may output measurement signals that indicate that the measurement spots SP1, SP2A-SP2C, SP3A-SP3C and SP4A-SP4E are in the indicated positions on the light beam sensors S1-S4. Given the known geometric relationships between the light beams B1, B2A-B2C, B3A-B3C and B4A-B4E and the light beam source configuration LC", the measurement signals from the light beam sensors S1-S4 indicate the position and orientation of the light beam source configuration LC". The measurement signals may be processed (e.g., by a processing portion 190), for which the processing may determine the position and orientation of the light beam source configuration LC" and/or an end tool ETL to which the light beam source configuration LC" is coupled (e.g., see FIG. 1), etc.

In the example of FIG. 6B (e.g., in comparison to the example of FIG. 6A), the light beam source configuration LC" is illustrated as having been rotated clockwise in the XY plane and moved up in the Z direction (i.e., parallel to the Z-axis, with certain similarities to the example of FIG. 5H). The view 610B (i.e., of the XY plane) illustrates the clockwise rotation and the top view of the different positions of the light beams B1, B2A-B2B, B3A-B3B and B4A-B4C on the light beam sensors S1-S4. It is noted that the light beams B2C, B3C and B4D-B4E are no longer directed to the respective light beam sensors, and are instead directed to spacings between the light beam sensors of the sensor configuration (e.g., such as may typically occur for some, or many, light beams in a relatively evenly distributed light beam pattern as directed towards a relatively limited number of light beam sensors which may have limited sizes and be at relatively large distances from the light beam source configuration, etc.). The cross section views 620B and 630B (i.e., at the cross sectional XZ plane and YZ plane, respectively) illustrate the different positions of the light beams B1 and B2A on the light beam sensors S1 and S2, respectively, and of the light beams B3A and B4A on the light beam sensors S3 and S4, respectively.

In the view 640B, the measurement spots SP1, SP2A-SP2B, SP3A-SP3B and SP4A-SP4C are illustrated as each having moved to the top and shifted to the right on the light beam sensors S1-S4, respectively. It is also noted that in the view 640B, there are no longer measurement spots SP2C, SP3C and SP4D-SP4E formed on the light beam sensors S2-S4 (i.e., due to the corresponding light beams B2C, B3C and B4D-B4E being directed to spaces between the light beam sensors). This example indicates in part why it may be desirable to have a sufficient number and/or relatively even distribution of light beams emanating in directions from a light beam source configuration. More specifically, given the sizes and possible distances of the light beam sensors from the light beam source configuration (e.g., during measurement operations) for a given implementation, it may generally be desirable for the light beam source configuration to provide a sufficient number and density of light beams in directions surrounding the light beam source configuration. Such factors for the light beam source configuration may help ensure that at least some, or all, of the light beam sensors of the sensor configuration have at least some light beams directed to them (e.g., for all possible orientations of the light beam source configuration during measurement operations) for producing corresponding measurement spots and corresponding measurement signals.

In the example of FIG. 6C (e.g., in comparison to the example of FIG. 6A), the light beam source configuration LC" is illustrated as having been rotated clockwise in the XY plane by a full 90 degrees. The view 610C (i.e., of the XY plane) illustrates the clockwise 90 degree rotation and the top view of the different positions of the light beams B1, B2A-B2C, B3A-B3C and B4A-B4E. Due to the 90 degree rotation, the light beam B1 is illustrated as being directed to the light beam sensor S4 (e.g., rather than the light beam sensor S1 as in the orientation of FIG. 5A). The light beams B2A-B2C are illustrated as being directed to the light beam sensor S3 (e.g., rather than the light beam sensor S2 as in the orientation of FIG. 5A). The light beams B3A-B3C are illustrated as being directed to the light beam sensor S1 (e.g., rather than the light beam sensor S3 as in the orientation of FIG. 5A). The light beams B4A-B4E are illustrated as being directed to the light beam sensor S2 (e.g., rather than the light beam sensor S4 as in the orientation of FIG. 5A). The light beam B1 and the central light beam B2B are each parallel to the Y-axis direction, and are each directed to the centers of the light beam sensors S4 and S3, respectively. Similarly, the central light beams B3B and B4C are each parallel to the X-axis direction, and are each directed to the centers of the light beam sensors S1 and S2, respectively.

In the orientation illustrated in FIG. 6C, the light beams B1, B2A-B2C, B3A-B3C and B4A-B4E produce corresponding measurement spots SP1, SP2A-SP2C, SP3A-SP3C and SP4A-SP4E on the light beam sensors S4, S3, S1 and S2, respectively. As illustrated in the view 640C, the measurement spots SP1, SP2B, SP3B and SP4C are all in the centers of the light beam sensors S4, S3, S1 and S2, respectively. As noted above, unlike FIGS. 5A-5H where only single measurement spots are produced on each light beam sensor, in FIG. 6C, different numbers of measurement spots are formed on different light beam sensors, in accordance with the pattern of light beams that are provided and directed by the light beam source configuration LC".

For example, while the light beam B1 produces only the single measurement spot SP1 at the center of the light beam sensor S4, the light beams B2A-B2C and B3A-B3C each produce a row of three measurement spots SP2A-SP2C and SP3A-SP3C across the middles of the light beam sensors S3 and S1, respectively. In addition, the light beams B4A-B4E produce a row of five measurement spots SP4A-SP4E across the middle of the light beam sensor S2. It will be appreciated that such characteristics may enable a determination of which light beams are directed to which light beam sensors (e.g., for enabling disambiguation in regard to the issues such as those described above).

For example, the measurement signal from the light beam sensor S4 indicates the position of the single measurement spot SP1 at the center of the light beam sensor S4, as uniquely corresponding to the light beam B1 (e.g., as compared to the orientation of FIG. 6A where the measurement signal from the light beam sensor S1 uniquely indicated the light beam B1 as directed to the light beam sensor S1). The measurement signal(s) from the light beam sensor S4 indicates the positions of the measurement spots SP4A-SP4E in the row at the middle of the light beam sensor S4, as uniquely corresponding to the light beams B4A-B4E (e.g., as compared to the orientation of FIG. 6A where the measurement signal(s) from the light beam sensor S4 uniquely indicated the light beams B4A-B4E as directed to the light beam sensor S4). In accordance with the pattern of light beams from the light beam source configuration LC'' having unique or otherwise differentiated pattern portions, corresponding unique pattern portion measurement spots may be formed on the respective light beam sensors that the pattern portions are directed to. Such configurations may enable the measurement signals from the light beam sensors to be utilized to determine which light beams are directed to which light beam sensors (e.g., for disambiguation and/or otherwise determining a position and orientation of the light beam source configuration LC'' in relation to the light beam sensors S1-S4, etc.)

FIGS. 7A and 7B are diagrams illustrating a first arrangement of measurement spots SP as formed by light beams from a light beam source configuration at first and second distances from a light beam sensor S1, respectively. In the example of FIG. 7A, the light beam source configuration is at the first distance, which is a relatively short distance (e.g., 10 cm) from the light beam sensor S1. The light beam source configuration emits a pattern of light beams with an angular spacing/angular dispersion such that, at the relatively short distance of FIG. 7A, many measurement spots SP are produced on the light beam sensor S1. In contrast, in the example of FIG. 7B, the light beam source configuration is at the second distance, which is a relatively longer distance (e.g., 60 cm) from the light beam sensor S1. As a result of the longer distance and the angular spacing/angular dispersion of the light beams, fewer measurement spots are produced on the light beam sensor S1. In addition, each of the corresponding measurement spots SP in FIG. 7B are larger than in FIG. 7A (e.g., given the additional divergence of the light beams over the longer distance to the sensor S1 in FIG. 7B).

FIGS. 8A and 8B are diagrams illustrating a second arrangement of measurement spots SP as formed by light beams from a light beam source configuration at first and second distances from a light beam sensor S1, respectively. FIGS. 8A and 8B show examples similar to those of FIGS. 7A and 7B, except for which the light beams and the corresponding pattern are more structured. For example, the light beams are arranged such that measurement spots are produced in evenly spaced rows and columns, with the light beams being more collimated or otherwise structured so as to produce measurement spots with larger sizes at shorter distances and with less variance in size at different distances. As illustrated in FIG. 8A, the measurement spots SP are illustrated as being produced on the light beam sensor S1 in the relatively evenly spaced rows and columns and with larger areas that are relatively similar to those of FIG. 8B.

In the example of FIG. 8A, the light beam source configuration is at a first distance from the light beam sensor S1, which may be a relatively shorter distance (e.g., 500 mm). The light beam source configuration emits the pattern of light beams with an angular spacing/angular dispersion such that, at the relatively short distance of FIG. 8A, many measurement spots are produced on the light beam sensor S1. In the example of FIG. 8B, the light beam source configuration is at a second distance from the light beam sensor S1, which may be a relatively longer distance (e.g., 1500 mm). As a result of the longer distance of FIG. 8B and the angular spacing/angular dispersion of the light beams, fewer measurement spots are produced on the light beam sensor S1. In the examples of FIGS. 8A and 8B, the light beam sensor S1 comprises an array of pixels (e.g., an array of 3600 pixels×5400 pixels).

In the various implementations, a processing/monitoring of the full area (e.g., corresponding to the full pixel array) of each light beam sensor of the sensor configuration 160 may take a certain amount of time (e.g., including an amount of time needed to monitor/process/read out the data of all of the pixels of the pixel array of each of the light beam sensors). In some implementations, such processing may be characterized in terms of a number of frames per second for each of the light beam sensors. As will be described in more detail below, in some implementations, in order to increase the overall speed of the processing, regions of interest may be determined, which may comprise a smaller area of a light beam sensor, and for which the processing/monitoring of the smaller region of interest area may correspondingly be performed more quickly (e.g., as compared to processing/monitoring the full sensor area). As will be described in more detail below, in certain implementations, for each light beam sensor of a set of light beam sensors (e.g., including light beam sensors that have measurement spots produced on them), a region of interest may be determined that includes a measurement spot produced by a light beam from the light beam source configuration.

In the examples of FIGS. 7A, 7B, 8A, and 8B, a region of interest ROI is illustrated as having been determined and which includes a measurement spot SP (e.g., as produced by a light beam from the light beam source configuration). In certain implementations, the determining of each region of interest ROI may include determining a size of the region of interest on the light beam sensor S1. For example, as illustrated in FIG. 7B, the size of the region of interest ROI is relatively larger (for including the relatively larger measurement spot SP, as compared to FIG. 7A). In FIG. 8B, the region of interest ROI may also be somewhat larger than the region of interest ROI in FIG. 8A, given the slight difference in sizes of the measurement spots, and for which in FIG. 8B the region of interest ROI can be somewhat larger and still include only a single measurement spot (e.g., given the density of measurement spots in FIG. 8B as compared to FIG. 8A).

It will be appreciated that the technique of utilizing the regions of interest ROI may in some implementations correspond to a monitoring/tracking of a smaller area and/or a fewer number of measurement spots (e.g., such as a single measurement spot on each light beam sensor, or otherwise a fewer number of measurement spots than the total number produced on the light beam sensor). In accordance with various examples as described herein, such a technique utilizing a smaller area and/or fewer number of measurement spots may be performed more quickly (e.g., as part of a high speed mode) and may still achieve a desirable level of accuracy for the determination of the position and orientation of the light beam source configuration. In certain implementations, the increase in the speed/measurement rate (e.g., as compared to the processing of the full area of a light beam sensor) may improve by approximately a ratio of a total number of pixels of the full sensor area divided by the number of pixels in the region of interest ROI on the light beam sensor. As one specific numerical example, in some instances this may correspond to an increase in measurement rate/speed by a factor of approximately 10 to 150, depending on the area of the region of interest relative to the full sensing area of the light beam sensor.

Figure 9A:
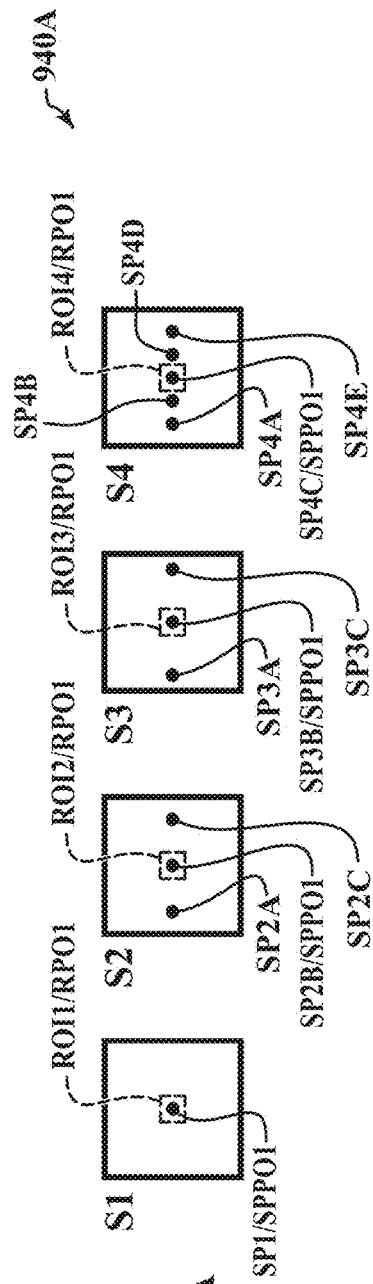
FIGS. 9A-9C are diagrams illustrating measurement spots on four sensors of a sensor configuration similar to that of FIGS. 6A-6C and with regions of interest.
Figure 9B:
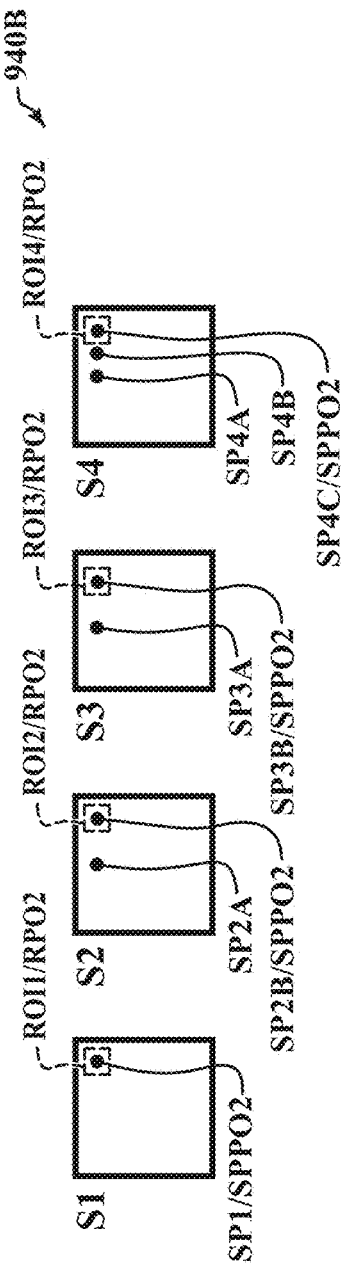
Figure 9C:
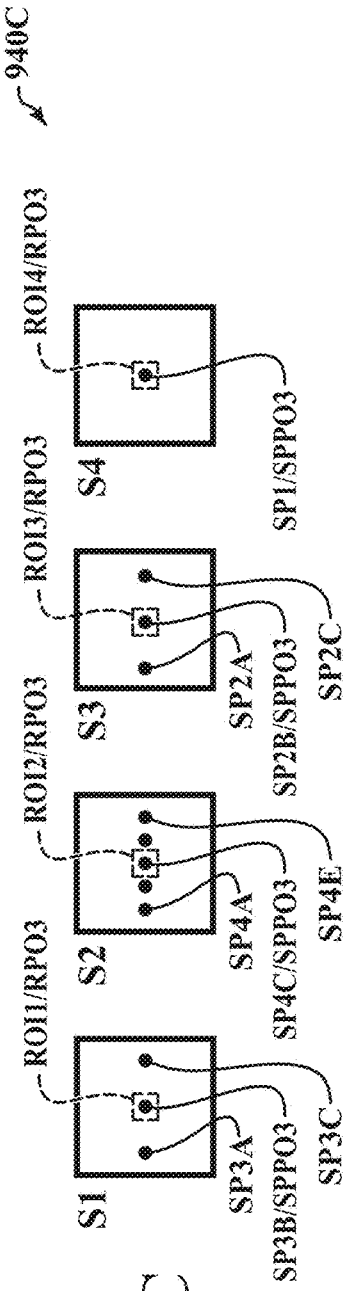

FIGS. 9A-9C are diagrams with views 940A-940C illustrating measurement spots SP on four light beam sensors S1-S4 of a sensor configuration similar to that shown in views 640A-640C of FIGS. 6A-6C. As illustrated in FIGS. 9A-9C, the regions of interest ROI1-ROI4 have been determined in accordance with principles as described herein, in accordance with a first operating mode (i.e., a high speed operating mode), as will be described in more detail below. As shown in FIG. 9A in the view 940A, measurement spots SP1, SP2A-SP2C, SP3A-SP3C and SP4A-SP4E have been produced on the light beam sensors S1-S4, respectively (e.g., as produced by the light beams B1, B2A-B2C, B3A-B3C and B4A-B4E as described above with respect to FIG. 6A). As illustrated in the view 940A, the measurement spots SP1, SP2B, SP3B and SP4C are all in the centers of the light beam sensors S1, S2, S3 and S4, respectively. As described above with respect to FIG. 6A, the light beam B1 produces the measurement spot SP1 at the center of the light beam sensor S1, the light beams B2A-B2C and B3A-B3C each produce a row of three measurement spots SP2A-SP2C and SP3A-SP3C across the middles of the light beam sensors S2 and S3, respectively, and the light beams B4A-B4E produce a row of five measurement spots SP4A-SP4E across the middle of the light beam sensor S4.

In various implementations, the regions of interest (e.g., including the corresponding positions and/or sizes, etc.) are determined based at least in part on position information that is received from the movement system 110 (e.g., including position information from the motion control system 140). As described herein, the motion control system 140 may provide position information which indicates with movement system accuracy the position of the light beam source configuration LC (e.g., within a metrology frame volume MFV) which may correspondingly indicate with movement system accuracy the locations of the light beams from the light beam source configuration, the locations of measurement spots produced on the light beam sensors, a distance of the light beam source configuration LC from each light beam sensor, etc. (e.g., and for which the fixed locations of the light beam sensors relative to the metrology frame volume MFV are known).

Alternatively or in addition, other data may be utilized for determining (e.g., estimating, projecting, etc.) such position information. For example, last known position data for the light beam source configuration LC, speed data, direction data, etc. (e.g., as determined by the motion control system 140 and/or otherwise by the metrology system 100) may be utilized to determine (e.g., in combination with current position data from the movement system 140 and/or movement estimates, projections, etc.) such position information, such as may be utilized for determining the regions of interest, etc. With respect to implementations in which the sizes of the regions of interest may be determined based on such position data, it is noted with respect to the examples of FIGS. 7B and 8B, which illustrate relatively larger sizes of regions of interest (e.g., relative to FIGS. 7A and 8A), that the distance of the light beam source configuration LC from a respective light beam sensor (e.g., as indicated at least in part by the position information from the movement system 110) may indicate the size that a respective region of interest should be.

As shown in FIG. 9A, on light beam sensor S1, the region of interest ROI1 is determined at a position RPO1, as including the measurement spot SP1 at a position SPPO1. As shown in FIG. 9B, on the light beam sensor S1, the region of interest ROI1 is determined at a position RPO2 as including the measurement spot SP1 at a position SPPO2. As shown in FIG. 9C, on the light beam sensor S1, the region of interest ROI1 is determined at a position RPO3, as including the measurement spot SP3B at the position SPPO3.

In relation to light beam sensor S1 in FIGS. 9A and 9B, it will be appreciated that the movement of the region of interest ROI1 from the position RPO1 to the position RPO2 corresponds to a movement of the first region of interest ROI1 to correspondingly maintain the measurement spot SP1 within the region of interest ROI1 (e.g., during a movement of the measurement spot SP1 over at least part of the sensing area of the light beam sensor S1). Similarly, in relation to light beam sensors S2, S3, and S4 in FIGS. 9A and 9B, the movements of the regions of interest ROI2, ROI3, and ROI4 from the positions RPO1 to the positions RPO2, correspond to movements of the regions of interest ROI2, ROI3, and ROI4 to correspondingly maintain the measurement spots SP2B, SP3B, and SP4C within the regions of interest ROI2, ROI3, and ROI4 (e.g., during movements of the measurement spots SP2B, SP3B, and SP4C over portions of the sensing areas of the light beam sensors S2, S3, and S4, respectively).

As show in FIG. 9A, on light beam sensor S2, the region of interest ROI2 is determined at a position RPO1, as including the measurement spot SP2B at a position SPPO1. As shown in FIG. 9B, on light beam sensor S2, the region of interest ROI2 is determined at a position RPO2, as including the measurement spot SP2B at a position SPPO2. As shown in FIG. 9C, on light beam sensor S2, the region of interest ROI2 is determined at a position RPO3, as including the measurement spot SP4C at a position SPPO3.

As shown in FIG. 9A, on light beam sensor S3, the region of interest ROI3 is determined at a position RPO1, as including the measurement spot SP3B at a position SPPO1. As shown in FIG. 9B, on light beam sensor S3, the region of interest ROI3 is determined at a position RPO2, as including the measurement spot SP3B at a position SPPO2. As shown in FIG. 9C, on light beam sensor S3, the region of interest ROI3 is determined at a position RPO3, as including measurement spot SP2B at a position SPPO3.

As shown in FIG. 9A, on light beam sensor S4, the region of interest ROI4 is determined at a position RPO1, as including measurement spot SP4C at a position SPPO1. As shown in FIG. 9B, on light beam sensor S4, the region of interest ROI4 is determined at a position RPO2, as including measurement spot SP4C at a position SPPO2. As shown in FIG. 9C, on the light beam sensor S4, the region of interest ROI4 is determined at a position RPO3, as including measurement spot SP1 at a position SPPO3.

With respect to a comparison between FIGS. 9B and 9C, for the light beam sensor S1, it is noted that the determining of the region of interest ROI1 in FIG. 9C is for including a different measurement spot than in FIG. 9B (i.e., for including measurement spot SP3B in FIG. 9C, as compared to measurement spot SP1 in FIG. 9B). Similarly, for the light beam sensors S2, S3, and S4, the determining of the regions of interest ROI2, ROI3, and ROI4 in FIG. 9C are for including a different measurement spot than was included in FIG. 9B. Such may correspond to a movement of a light beam source configuration such that a light beam that was producing a measurement spot on a light beam sensor is moved (e.g., toward and off an edge of the light beam sensor) so as to no longer be producing a measurement spot on the light beam sensor. In relation to such an occurrence, a region of interest of the light beam sensor may be determined for including a different measurement spot as produced by a different light beam that is currently directed toward the light beam sensor. The region of interest may then continue to be determined so as to move/track with the new measurement spot as it moves across at least part of the surface/sensing area of the corresponding light beam sensor.

The light beam sensors S1-S4 may output measurement signals that indicate that the measurement spots SP1, SP2B, SP3B, and SP4C that are within the respective regions of interest ROI are in the indicated positions on the light beam sensors S1-S4. In various implementations, the processing to determine the location of the measurement spot within the region of interest may be similar to the processing that is performed to determine a location of a measurement spot within the full sensor area, although with a smaller area being processed for the region of interest. Given the known geometric relationships between the light beams B1, B2B, B3B, and B4C and the light beam source configuration (e.g., as illustrated and described with respect to FIGS. 6A-6C), the measurement signals from the light beam sensors S1-S4 indicate the position and orientation of the light beam source configuration. The measurement signals may be processed (e.g., by a processing portion 190), for which the processing may determine the position and orientation of the light beam source configuration and/or an end tool ETL to which the light beam source configuration is coupled (e.g., see FIG. 1), etc. With respect to the determination of the position and orientation based on the single measurement spots (i.e., in the respective regions of interest), it will be appreciated that the examples of FIGS. 9A and 9B are similar to the examples of FIGS. 5A and 5H, respectively, as described above. The examples of FIGS. 5A and 5H also correspond to processing based on single measurement spots and in similar corresponding positions as shown in FIGS. 9A and 9B, and for which the processing to determine position and orientation (e.g., of the light beam source configuration) will similarly be understood.

In certain implementations, the system may be configured such that regions of interest will generally not be determined for measurement spots with certain characteristics. For example, in some implementations, "zero order" light beams which are provided by the light beam source configuration may be very bright which may cause certain issues (e.g., related to saturation, resulting in blind spots, etc.), and for which the system may be configured so as to avoid determining regions of interest for including measurement spots with such characteristics.

FIGS. 10A, 10B and 10C are diagrams illustrating certain simplified examples of alternative or additional techniques for determining a position and orientation of a light beam source configuration. In the examples of FIGS. 10A, 10B and 10C, it will be appreciated that the locations of the measurement spots may be determined utilizing regions of interest, as described above. In FIGS. 10A, 10B, and 10C, light beam sensors SX, SY, and SZ are positioned in orthogonal orientations (e.g., relative to one another and as may be characterized as each being orthogonal to a respective X, Y, and Z axis direction). A light beam source configuration LC is illustrated as providing at least light beams BX, BY, and BZ, as directed toward the light beam sensors SX, SY, and SZ, respectively. The light beams BX, BY, and BZ are indicated as intersecting with and forming measurement spots at spot locations SPLX, SPLY, and SPLZ on the light beam sensors SX, SY, and SZ, respectively. It will be appreciated that since the sensing surfaces of the light beam sensors SX, SY, and SZ are not visible in the illustrated orientations of FIGS. 10A, 10B, and 10C, the locations SPLX, SPLY, and SPLZ of the measurement spots are indicated from the back sides of the light beam sensors SX, SY, and SZ, respectively (e.g., and that as noted above, regions of interest on the light beam sensors SX, SY, and SZ may be utilized for determining the locations of the measurement spots).

FIG. 10B illustrates a simplified example of one way in which a rotation of the light beam source configuration may be determined utilizing the light beam sensors SX, SY, and SZ. With FIG. 10A illustrating an initial orientation and position, FIG. 10B illustrates an instance in which the light beam source configuration LC has been rotated by a small amount (e.g., around the Z-axis). Corresponding positions of the light beams and measurement spots are indicated with prime designations. As illustrated in FIG. 10B, after the rotation, the positions of the light beams are indicated by light beams BX', BY', and BZ', and the positions of the measurement spots are indicated as SPLX', SPLY', and SPLZ'. As indicated, the light beam BZ' and the position SPLZ' of the measurement spot have not changed in relation to the positions of FIG. 10A. In one implementation, a method for determining that rotation has occurred, is to determine that the paths of the measurement spots across the light beam sensors SX and SY are parallel to the plane of the surface of the light beam sensor SZ, which the light beam sensor with the stationary measurement spot at the position SPLZ'.

FIG. 10C illustrates a similar example, except for translation of the light beam source configuration LC. In FIG. 10C, the changes in positions of the light beams and measurement spots are indicated by double prime designations (i.e., relative to the example of FIG. 10A). As illustrated in FIG. 10C, after the translation of the light beam source configuration LC, the positions of the light beams are indicated by light beams BX", BY", and BZ", and the positions of the measurement spots are indicated as SPLX", SPLY", and SPLZ". As indicated, the light beam BY" and the position SPLY" have not changed in relation to the position of FIG. 10A. In one implementation, a method for determining that translation has occurred, is to determine that the paths of the measurement spots across the light beam sensors SX" and SZ" are perpendicular to the plane of the surface of the light beam sensor SY" which is the light beam sensor with the stationary measurement spot.

Figure 11:
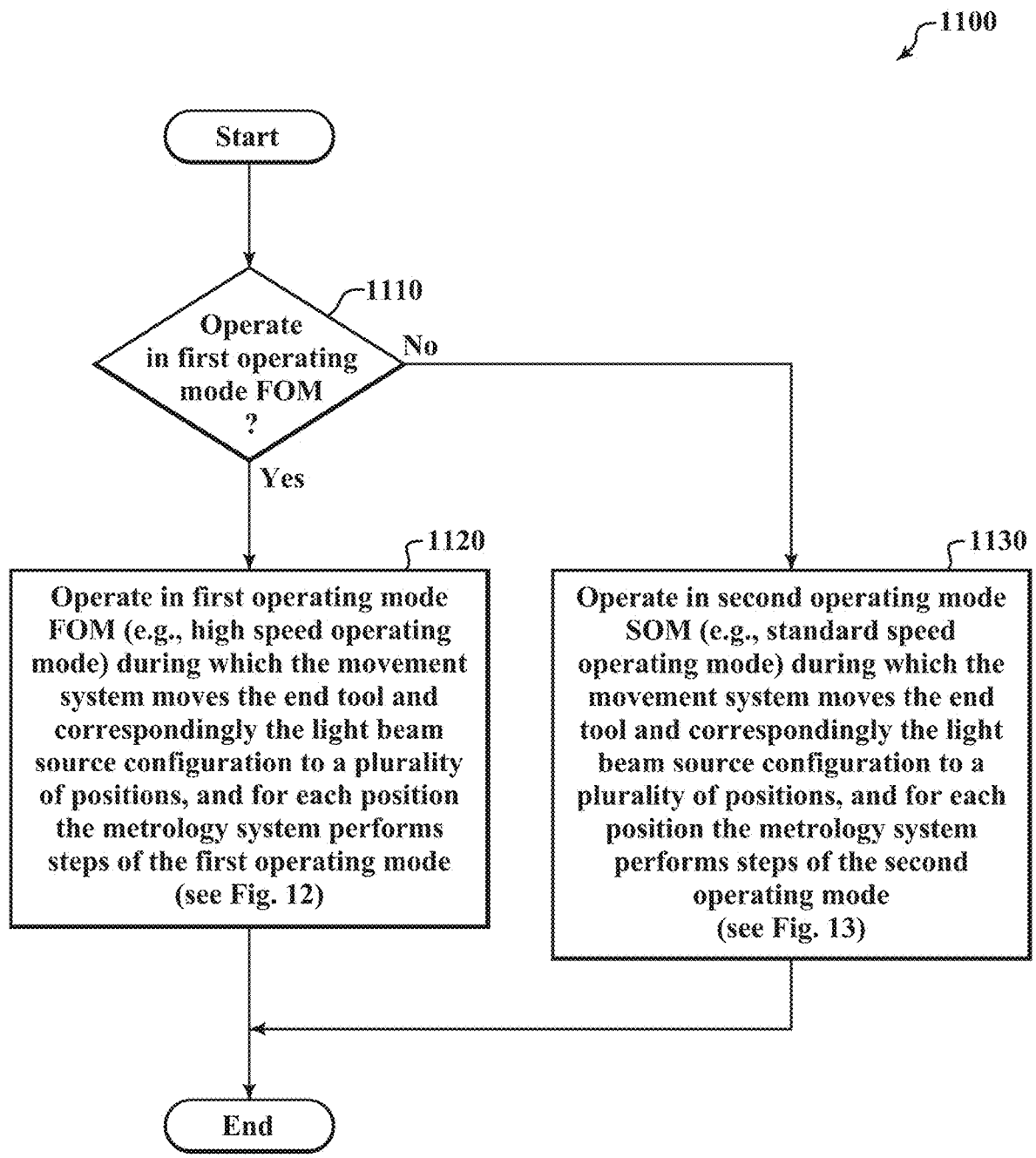
FIG. 11 is a flow diagram illustrating one exemplary implementation of a routine for operating a metrology system in which either a first operating mode (e.g., a high speed operating mode) or a second operating mode (e.g., a standard speed operating mode) may be utilized.

FIG. 11 is a flow diagram illustrating one exemplary implementation of a routine 1100 for operating a metrology system in which either a first operating mode (e.g., a high speed operating mode) or a second operating mode (e.g., a standard speed operating mode) may be utilized. At a decision block 1110, a determination is made as to whether a first operating mode will be utilized. In various implementations, such a determination may be made based on input from a user (e.g., a user may be provided with an option for utilizing the first operating mode or the second operating mode, such as through a selection element in a user interface or other means) and/or such a determination may be made based at least in part on analysis by the metrology system (e.g., based on a desired operating speed and/or a desired level of accuracy for the position and orientation determinations of the light beam source configuration LC and/or other factors, etc.).

If the second operating mode is to be utilized rather than the first operating mode, the routine proceeds to a block 1130, as will be described in more detail below. If the first operating mode (e.g., a high speed operating mode) is to be utilized, the routine proceeds to a block 1120, where the metrology system is operated in the first operating mode, during which the movement system moves the end tool and correspondingly the light beam source configuration to a plurality of positions, and for each position the metrology system performs steps of the first operating mode (e.g., as will be described in more detail below with respect to FIG. 12). Alternatively, at the block 1130, the metrology system is operated in the second operating mode (e.g., a standard speed operating mode) during which the movement system moves the end tool and correspondingly the light beam source configuration to a plurality of positions, and for each position the metrology system performs steps of the second operating mode (e.g., as will be described in more detail below with respect to FIG. 13).

Figure 12:
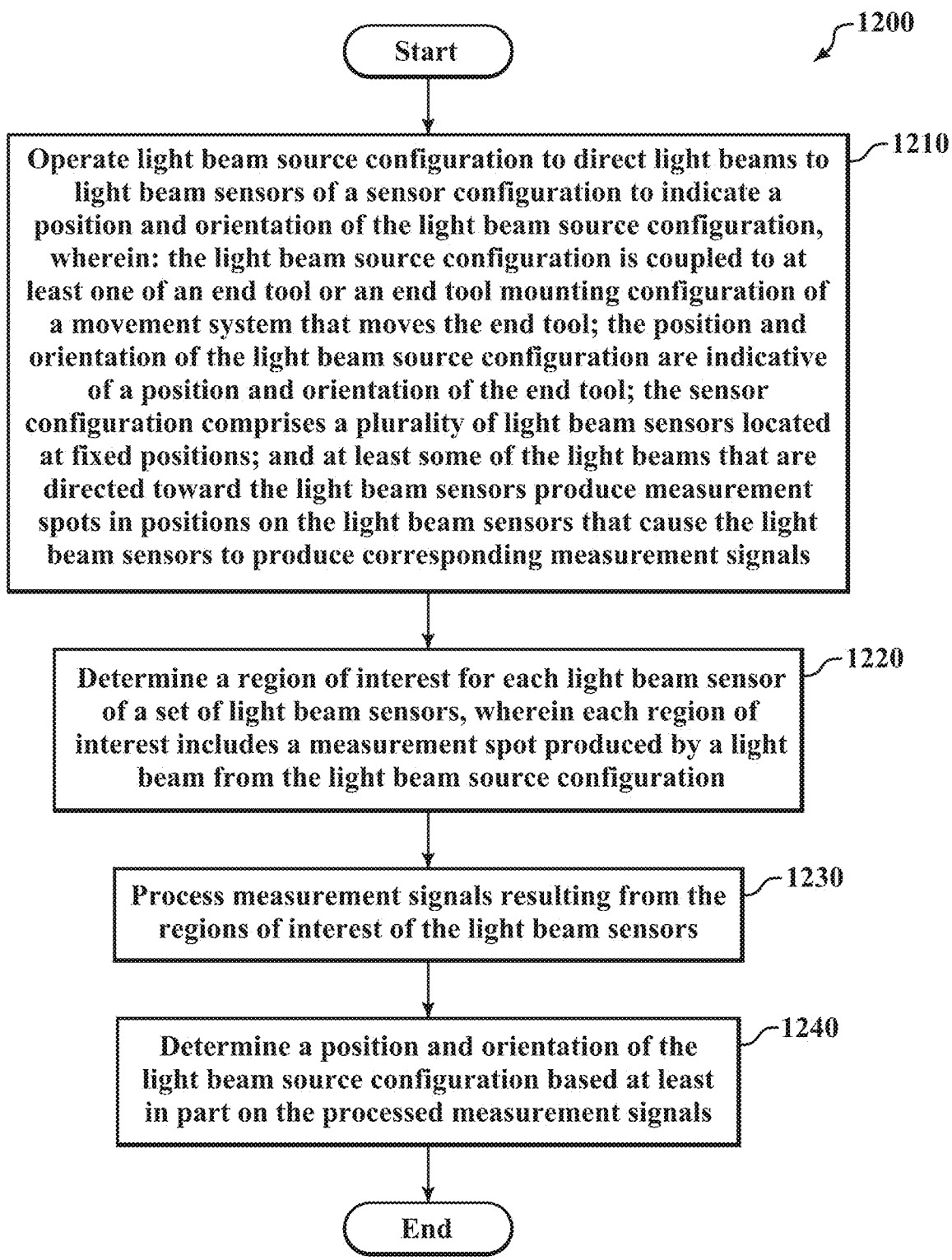
FIG. 12 is a flow diagram illustrating one exemplary implementation of a routine for a first operating mode (e.g., a high speed operating mode)

FIG. 12 is a flow diagram illustrating one exemplary implementation of a routine 1200 for a first operating mode (e.g., a high speed operating mode). At a block 1210, a light beam source configuration is operated to direct light beams to light beam sensors of a sensor configuration to indicate a position and orientation of the light beam source configuration. As described above, the light beam source configuration is coupled to at least one of an end tool or an end tool mounting configuration of a movement system that moves the end tool. The position and orientation of the light beam source configuration are indicative of a position and orientation of the end tool. The sensor configuration comprises a plurality of light beam sensors located at fixed positions. At least some of the light beams that are directed toward the light beam sensors produce measurement spots in positions on the light beam sensors that cause the light beam sensors to produce corresponding measurement signals.

At a block 1220, a region of interest is determined for each light beam sensor of a set of light beam sensors (e.g., so as to reduce the processing that would be required for processing measurement signals from the full sensing areas of the light beam sensors). In various implementations, the set of light beam sensors includes at least some or all of the light beam sensors on which measurement spots are produced (e.g., for which in some implementations any light beam sensors that do not have a measurement spot produced on them may not be included in the set). Each region of interest includes a measurement spot produced by a light beam from the light beam source configuration. At a block 1230, measurement signals resulting from the regions of interest of the light beam sensors are processed (e.g., as opposed to processing measurement signals from the full sensing areas of the light beam sensors). At a block 1240, a position and orientation are determined of the light beam source configuration based at least in part on the processed measurement signals.

As noted above, in various implementations, a measurement rate of the metrology system 100 may be limited by a processing rate of the light beam sensors of the sensor configuration 160. In some implementations, a processing rate of the light beam sensors may be characterized in terms of a number of frames per second, or other characteristic. As described above, in order to achieve a higher measurement rate (e.g., as part of a high speed operating mode), rather than performing processing based on the full sensing area of each of the light beam sensors, smaller regions of interest (e.g., which may monitor/track a single measurement spot on each light beam sensor), may be utilized.

As a specific numerical example, in one implementation it may be desirable for the metrology system to operate with a two kilohertz measurement rate, which in some instances may correspond to readout speeds of approximately 2,000 frames per second for the light beam sensors. By utilizing regions of interest to reduce the size of the frames that are being read out from the light beam sensors, faster measurement rates may be achieved. With respect to enabling the regions of interest to be able to track with and/or be accurately positioned in relation to the measurement spots that are produced, position information from the movement system 110 (e.g., from the motion control system 140) may be utilized.

In various implementations, as described above with respect to the examples of FIGS. 9A-9C, if a measurement spot that is being tracked by a region of interest moves close to the edge of the light beam sensor, the region of interest may leave that measurement spot and be moved to track a different measurement spot on the light beam sensor (e.g., closer to the middle of the light beam sensor or otherwise less likely to move off the edge of the light beam sensor). In various implementations, for at least some of the light beam sensors, a plurality of regions of interest may be determined, with each region of interest including a measurement spot produced on the light beam sensor. It will be appreciated that in such an implementation, when one measurement spot moves off the edge of a given light beam sensor, other measurement spots may still be being tracked by associated regions of interest on the light beam sensor. In certain implementations, regions of interest may be determined for some or all of the measurement spots that are produced on a light beam sensor. In various implementations, certain measurement processes may include switching between the first and second operating modes. For example, in an instance where a measurement spot is moving close to an edge of a light beam sensor and a corresponding region of interest is to be moved to include a different measurement spot on the light beam sensor, a determination may be made to (e.g., at least briefly) operate in the second operating mode (e.g., the standard speed operating mode) during which the full sensing area of the light beam sensor is processed (e.g., in order to identify another measurement spot on the light beam sensor that the region of interest will be moved to).

In general, it will be appreciated that a tradeoff exists between the first and second operating modes, in that the first operating mode is able to be performed more quickly and may achieve a desirable level of accuracy (e.g., for the determinations of the position and orientation of the light beam source configuration), while the second operating mode requires more processing time and is generally slower, but may achieve even higher levels of accuracy. In some implementations, the first and second operating modes may be utilized in combination (e.g., with the second operating mode being utilized at certain times during a process for making highly accurate determinations of position and orientation, and with the first operating mode being utilized with the high speed at other times during the process).

Figure 13:
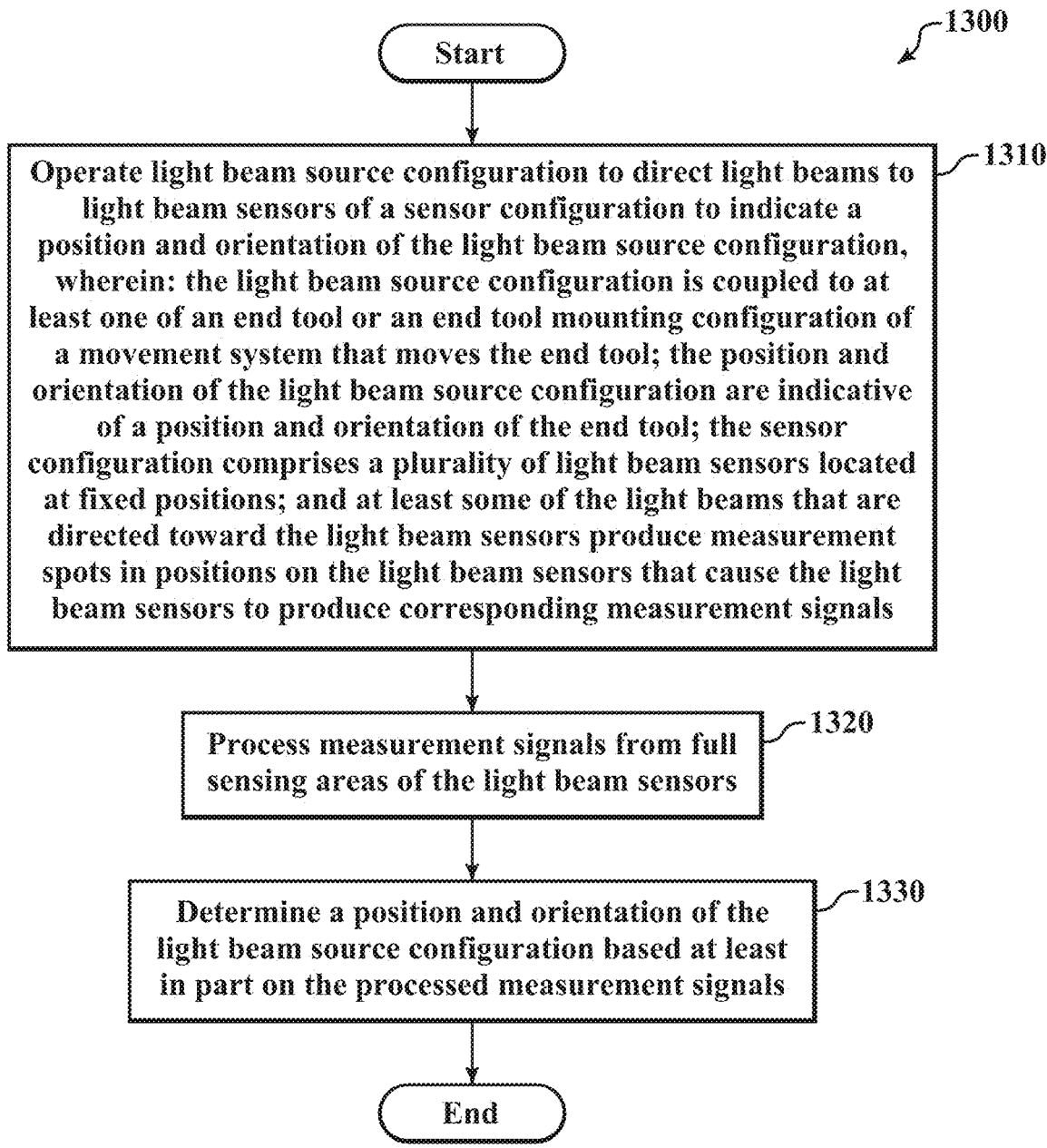
FIG. 13 is a flow diagram illustrating one exemplary implementation of a routine for a second operating mode (e.g., a standard speed operating mode).

FIG. 13 is a flow diagram illustrating one exemplary implementation of a routine 1300 for a second operating mode (e.g., a standard speed operating mode). At a block 1310, a light beam source configuration is operated to direct light beams to light beam sensors of a sensor configuration to indicate a position and orientation of the light beam source configuration. As described above, the light beam source configuration is coupled to at least one of an end tool or an end tool mounting configuration of a movement system that moves the end tool. The position and orientation of the light beam source configuration are indicative of a position and orientation of the end tool. The sensor configuration comprises a plurality of light beam sensors located at fixed positions. At least some of the light beams that are directed toward the light beam sensors produce measurement spots in positions on the light beam sensors that cause the light beam sensors to produce corresponding measurement signals.

At a block 1320, measurement signals are processed from full sensing areas of the light beam sensors (e.g., rather than reducing the processing by only processing measurement signals from determined regions of interest that are smaller than the full sensing areas, such as is done in the first/high speed operating mode). At a block 1330, a position and orientation are determined of the light beam source configuration based at least in part on the processed measurement signals.

In various implementations, the routine 1300 further includes the following steps: determining that the metrology system 100 will be operated in a second operating mode SOM that is an alternative to the first operating mode FOM; and operating the metrology system 100 in the second operating mode SOM, during which the movement system 110 moves the end tool ETL and correspondingly the light beam source configuration LC to a plurality of positions, and for each position the metrology system 100: operates the light beam source configuration LC to direct light beams to light beam sensors S1-S4 of the sensor configuration 160 to indicate a position and orientation of the light beam source configuration LC; processes measurement signals from full sensing areas of the light beam sensors S1-S4 (e.g., rather than reducing the processing by only processing measurement signals from determined regions of interest ROI that are smaller than the full sensing areas); and determines a position and orientation of the light beam source configuration LC based at least in part on the processed measurement signals.

The following describes various exemplary embodiments of the present disclosure with various features and elements annotated with reference numerals found in FIGS. 1-13. It should be understood that the reference numerals are added to indicate exemplary embodiments, and the features and elements are not limited to the particular embodiments illustrated in FIGS. 1-13.

As described herein, a metrology system 100 is provided for use with a movement system 110 that moves an end tool ETL. The movement system 110 comprises a movable configuration MAC and a motion control system 140. The movable configuration MAC comprises an end tool mounting configuration ETMC that an end tool ETL is configured to mount to. The motion control system 140 is configured to control an end tool position and orientation, based at least in part on controlling the movable configuration MAC so as to move at least a portion of an end tool ETL that is mounted to the end tool mounting configuration ETMC within a movement volume MV.

The metrology system 100 comprises a sensor configuration 160, a light beam source configuration LC and a processing portion 190. The sensor configuration 160 comprises a plurality of light beam sensors (e.g., such as including light beam sensors S1-S4) located at fixed positions. The light beam source configuration LC is configured to direct light beams to light beam sensors of the sensor configuration 160 to indicate a position and orientation of the light beam source configuration LC. The light beam source configuration LC is configured to be coupled to at least one of an end tool ETL or the end tool mounting configuration ETMC. At least some light beams that are directed toward the light beam sensors are configured to produce measurement spots SP in positions on the light beam sensors that cause the light beam sensors to produce corresponding measurement signals.

The processing portion 190 is configured to process measurement signals from the light beam sensors of the sensor configuration 160 to determine a position and orientation of the light beam source configuration LC. As part of a first operating mode FOM, during which the movement system 110 is configured to move the end tool ETL and correspondingly the light beam source configuration LC to a plurality of positions, for each position the metrology system 100 is configured to: determine a region of interest ROI for each light beam sensor of a set of light beam sensors (e.g., which reduces the processing that would be required for processing measurement signals from the full sensing areas of the light beam sensors), wherein each region of interest ROI includes a measurement spot SP produced by a light beam from the light beam source configuration LC; process measurement signals resulting from the regions of interest ROI of the light beam sensors (e.g., as opposed to processing measurement signals from the full sensing areas of the light beam sensors); and determine a position and orientation of the light beam source configuration LC based at least in part on the processed measurement signals.

In various implementations, the processing portion 190 is configured to determine at least one region of interest ROI for a first light beam sensor S1 and to process measurement signals for the at least one region of interest ROI (e.g., so as to reduce the processing that would be required for processing measurement signals from the full sensing area of the first light beam sensor), and for which each region of interest ROI includes a measurement spot SP and each region of interest ROI is moved to maintain the corresponding measurement spot SP within the region of interest ROI.

In various implementations, the determining of the regions of interest ROI comprises determining positions of the regions of interest ROI on the respective light beam sensors (e.g., light beam sensors S1-S4). In various implementations, the regions of interest ROI are determined based at least in part on position information that is received from the movement system 110. In various implementations, the determining of the regions of interest ROI comprises determining sizes of the regions of interest ROI on the respective light beam sensors (e.g., light beam sensors S1-S4). In various implementations, each region of interest ROI is a minority of the full sensing area of the light beam sensor. For example, in certain implementations each region of interest ROI may be less than ½, or ¼, or ⅛ of the full sensing area of the light beam sensor.

In various implementations, as part of a second operating mode SOM (e.g., which is an alternative to the first operating mode FOM), during which the movement system 110 is configured to move the end tool ETL and correspondingly the light beam source configuration LC to a plurality of positions, for each position the metrology system 100 is configured to: process measurement signals from full sensing areas of the light beam sensors (e.g., rather than reducing the processing by only processing measurement signals from determined regions of interest ROI that are smaller than the full sensing areas); and determine a position and orientation of the light beam source configuration LC based at least in part on the processed measurement signals.

In various implementations, for a first position of the light beam source configuration LC (e.g., as corresponding to FIGS. 6A and 9A), for which a first light beam B1 is directed toward and produces a first measurement spot SP1 at a first position SPPO1 on a first light beam sensor S1, the region of interest that is determined is a first region of interest ROI1 that includes the first measurement spot SP1 in the first position SPPO1. For a movement of the light beam source configuration LC from the first position to a second position (e.g., as corresponding to FIGS. 6B and 9B), such as results in a movement of the first light beam B1 and a corresponding movement of the first measurement spot SP1 from the first position SPPO1 to a second position SPPO2 on the first light beam sensor S1, the region of interest that is determined is the first region of interest ROI1 which includes the first measurement spot SP1 at the second position SPPO2 and corresponds to a movement of the first region of interest ROI1 (e.g., from a first position RPO1 to a second position RPO2) to correspondingly maintain the first measurement spot SP1 within the first region of interest ROI1 (e.g., during a movement of the first measurement spot SP1 over at least part of the sensing area of the first light beam sensor S1). In various implementations, the determining of the region of interest ROI1 at the second position RPO2 is based at least in part on position information from the movement system 110 which indicates the movement of the light beam source configuration LC and the corresponding movement of the first light beam B1 and the corresponding movement of the first measurement spot SP1 (e.g., from the first position SPPO1 to the second position SPPO2) on the first light beam sensor S1. While this example has been described and annotated with respect to the sensor S1 in FIGS. 9A and 9B, it will be appreciated that this description also applies with respect to any of the sensors S2, S3 and/or S4, the corresponding regions of interest ROI2, ROI3 and/or ROI4, the corresponding measurement spots SP2B, SP3B and/or SP4C, and the corresponding light beams B2B, B3B and/or B4C, respectively, in FIGS. 9A and 9B (and with the corresponding movements and light beams as indicated in FIGS. 6A and 6B).

In various implementations, for a first position of the light beam source configuration LC (e.g., as corresponding to FIGS. 6A and 9A, or alternatively to FIGS. 6B and 9B), for which a first light beam B1 is directed toward and produces a first measurement spot SP1 at a first position SPPO1 on a first light beam sensor S1, the region of interest that is determined for the first light beam sensor is a first region of interest ROI1 (e.g., at a first position RPO1) that includes the first measurement spot SP1 in the first position SPPO1, and a second light beam B3B is not directed toward the first light beam sensor S1. For a movement of the light beam source configuration LC from the first position to a second position (e.g., as corresponding to FIGS. 6C and 9C), such as results in a movement of the first light beam B1 to no longer be directed toward the first light beam sensor S1 and for the second light beam B3B to be directed toward and produce a second measurement spot SP3B (e.g., at a position SPPO3) on the first light beam sensor S1, the region of interest that is determined for the first light beam sensor S1 is the first region of interest ROI1 (e.g., at the position RPO3) which is determined so as to include the second measurement spot SP3B on the first light beam sensor S1. In various implementations, for the second position of the light beam source configuration LC, for which the first light beam B1 is directed toward and produces a first measurement spot SP1 at a position SPPO3 on a second light beam sensor S4, the region of interest that is determined for the second light beam sensor S4 is a second region of interest ROI4 (at a position RPO3) that includes the first measurement spot SP1 in the position SPPO3 (e.g., which in various implementations may be designated as a first position or a second position of the first measurement spot SP1 on the second light beam sensor S4). While this example has been described and annotated with respect to the sensors S1 and S4 in FIGS. 9A and 9C, it will be appreciated that this description also applies with respect to any of the sensors S2 and S3, or S3 and S1, or S4 and S2, the corresponding regions of interest ROI2 and ROI3, or ROI3 and ROI1, or ROI4 and ROI2, respectively, and the corresponding measurement spots and light beams, in FIGS. 9A and 9C (and with the corresponding movements and light beams as indicated in FIGS. 6A and 6C) and/or with respect to any of the sensors S1 and S4, or S2 and S3, or S3 and S1, or S4 and S2, the corresponding regions of interest ROI1 and ROI4, or ROI2 and ROI3, or ROI3 and ROI1, or ROI4 and ROI2, respectively, and the corresponding measurement spots and light beams, in FIGS. 9B and 9C (and with the corresponding movements and light beams as indicated in FIGS. 6B and 6C).

In various implementations, the utilization of the regions of interest ROI in the first operating mode FOM reduces the required time and processing of the measurement signals from the light beam sensors (e.g., light beam sensors S1-S4), in relation to a second operating mode SOM in which the full sensing areas of the light beam sensors are utilized for the processing of the measurement signals. In various implementations, for a first light beam sensor (e.g., light beam sensor S1 of FIG. 9C) on which a plurality of measurement spots SP (e.g., measurement spots SP3A, SP3B and SP3C) are produced by a plurality of light beams that are directed towards the first light beam sensor, measurement signals that would result from measurement spots SP outside of the first region of interest ROI (e.g., measurement spots SP3A and SP3C that are outside of the region of interest ROI1) are not processed to determine the position and orientation of the light beam source configuration LC. Similar of examples with measurement spots outside of the respective regions of interest can be seen and understood with respect to light beam sensors S2, S3 and S4 in FIGS. 9A and 9B, and light beam sensors S2 and S3 in FIG. 9C.

In various implementations, each of the light beam sensors (e.g., light beam sensors S1-S4) comprises a two dimensional position sensitive sensor, for which the measurement signals from the light beam sensors indicate the two dimensional positions of measurement spots SP on the light beam sensors that are produced by light beams. In various implementations, a metrology frame volume MFV is defined at least in part by the plurality of light beam sensors (e.g., light beam sensors S1-S4) located at the fixed positions, for which the metrology frame volume MFV is configured to surround at least part of the movement volume MV. In various implementations, the light beam source configuration LC comprises one or more diffractive optical elements DOE and at least some of the light beams from the light beam source configuration LC are diffracted light beams DLB.

In various implementations, the motion control system 140 is configured to sense and control a position and orientation of the end tool ETL with a level of accuracy defined as a movement system accuracy, based at least in part on sensing and controlling the position and orientation of the end tool ETL using a plurality of position sensors SEN included in the movable configuration MAC. The processing portion 190 is operable to determine a position and orientation of the end tool ETL with an accuracy level that is better than the movement system accuracy, based at least in part on processing the measurement signals from the light beam sensors (e.g., light beam sensors S1-S4) to determine a position and orientation of the light beam source configuration LC, and for which the position and orientation of the light beam source configuration LC are indicative of the position and orientation of the end tool ETL.

In various implementations, for a first position of the light beam source configuration LC (e.g., as corresponding to FIGS. 6A and 9A, or FIGS. 6C and 9C), the light beams directed by the light beam source configuration LC to the sensor configuration 160 include a first light beam (e.g., light beam B1 or B3B), and a determination of which light beam sensor the first light beam is directed to is based at least in part on a sensed position and orientation with movement system accuracy as determined by utilizing the plurality of position sensors SEN included in the movable configuration MAC. The light beam sensor that the first light beam is directed to is a first light beam sensor (e.g., light beam sensor S1), for which a first region of interest ROI (e.g., region of interest ROI1) is determined that includes a first measurement spot (e.g., measurement spot SP1 or SP3B) as produced by the first light beam, and the processing portion 190 is operable to determine the position and orientation of the end tool ETL with an accuracy level that is better than the movement system accuracy, based at least in part on processing a first measurement signal from the first region of interest ROI of the first light beam sensor, for which the first measurement signal indicates a position of the first measurement spot (e.g., measurement spot SP1 or SP3B) as formed by the first light beam on the first light beam sensor. While this example has been described and annotated with respect to the sensor S1 in FIG. 9A or 9C, it will be appreciated that this description also applies with respect to any of the sensors S1-S4, the corresponding regions of interest, the corresponding measurement spots, and the corresponding light beams, in FIGS. 9A-9C (and with the corresponding movements and light beams as indicated in FIGS. 6A-6C).

In various implementations, for one or more of the light beam sensors of the set of light beam sensors, a plurality of regions of interest ROI may be determined on each of the one or more light beam sensors, wherein each region of interest includes a measurement spot produced by a light beam from the light beam source configuration. As an example, in an alternative implementation of FIG. 9A, on the sensor S2, an additional region of interest may be determined that includes the measurement spot SP2A and/or an additional region of interest may be determined that includes the measurement spot SP2C. Similarly, on the sensor S3, an additional region of interest may be determined that includes the measurement spot SP3A and/or an additional region of interest may be determined that includes the measurement spot SP3C. Similarly, on the sensor S4, an additional region of interest may be determined that includes the measurement spot SP4A, an additional region of interest may be determined that includes the measurement spot SP4B, an additional region of interest may be determined that includes the measurement spot SP4D, and/or an additional region of interest may be determined that includes the measurement spot SP4E.

As noted herein, the sizes of the regions of interest ROI may vary (e.g., as described with respect to the examples of FIGS. 7A, 7B, 8A and 8B, etc.). As one specific example, in some instances a region of interest that is determined on a light beam sensor may generally be larger for including a larger measurement spot that may be produced when the light beam source configuration is relatively closer to the light beam sensor. Correspondingly, in some instances a region of interest that is determined on a light beam sensor may generally be smaller for including a smaller measurement spot that may be produced when the light beam source configuration is relatively further from the light beam sensor.

It will be appreciated that in some implementations, if the determined regions of interest are not appropriately sized, certain undesirable effects may occur. For example, if a determined region of interest is too large, the region of interest may undesirably include multiple measurement spots. As another example, if a determined region of interest is too small, the region of interest may undesirably include only a fraction of a single measurement spot. In the examples of FIGS. 9A-9C, for simplicity of the illustration, all of the regions of interest are shown to be of comparable sizes, although it will be appreciated that in various implementations the sizes of the regions of interest may vary. In some implementations, the sizes of the regions of interest (e.g., such as illustrated in FIGS. 9A-9C) may be of comparable sizes on different light beam sensors (e.g., in an instance where the light beam source configuration is approximately at the same distance from each of the light beam sensors, such as illustrated in the top views of the corresponding FIGS. 6A-6C and/or in instances where the light beams may have little divergence over distances such that the sizes of the measurements spots do not have much variance at the different distances).

In an implementation in which the sizes of the determined regions of interest are not made to vary (i.e., where the determined regions of interest are approximately the same size), then the acquisition by the light beam sensors (e.g., of the images of the measurement spots) may be synchronized. If in such an implementation the measurement spots vary in size, then algorithms and/or other methods may be configured to address issues where a determined region of interest does not successfully include a single measurement spot. For example, in an instance where a determined region of interest is too large, and for which the region of interest undesirably includes multiple measurement spots, the processing may be configured to isolate a single measurement spot from within the region of interest. As another example, in an instance where a determined region of interest is too small, and for which the region of interest undesirably includes only a fraction of a single measurement spot, the processing may be configured to discard the image of the measurement spot (e.g., if such is deemed unreliable).

In implementations in which the sizes of the determined regions of interest are made to vary (i.e., where the determined regions of interest may be of different sizes), it is noted that in some such implementations the timing of the acquisition by the light beam sensors (e.g., of the images of the measurement spots) may vary. For example, the acquisition timing may be relatively longer for light beam sensors with larger regions of interest and relatively shorter for light beam sensors with smaller regions of interest (e.g., due to the timing associated with the processing/reading out, etc. for the larger areas of the larger regions of interest versus the smaller areas of the smaller regions of interest). In certain implementations, this may result in the light beam sensors running asynchronously, for which the system may be configured to interpolate (e.g., lag) or extrapolate (e.g., for which there may be accuracy concerns/issues in some implementations) measurement spot position information from the slower light beam sensors with the larger regions of interest. As an alternative, certain techniques may be utilized to synchronize the acquisition by the light beam sensors. For example, in certain implementations, in relation to a light beam sensor with a largest region of interest, the acquisition timing of the other light beam sensors with the smaller regions of interest may be slowed down/delayed so as to run synchronously with the light beam sensor with the largest region of interest.

In various implementations, at least some of the light beam sensors may each have multiple determined regions of interest simultaneously (e.g., with each region of interest including one of multiple measurement spots produced on the respective light beam sensor). In some such implementations, the number of the determined regions of interest may be adjusted or otherwise determined based on a tradeoff (e.g., such as between speed and accuracy, etc.). In certain implementations, a region of interest may be determined for each measurement spot that is produced on each light beam sensor. Such implementations may be compared to the second operating mode/standard speed operating mode, for which approximately a same number of measurement spots may be determined/utilized (e.g., in some cases corresponding to all of the produced measurement spots), although for which the utilization of the regions of interest may make the overall processing faster than the second operating mode/standard speed operating mode (e.g., due to only processing the regions of interest rather than the full sensor areas).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system for use with a movement system that moves an end tool,
the movement system comprising:
a movable configuration comprising an end tool mounting configuration that an end tool is configured to mount to; and
a motion control system configured to control an end tool position and orientation, based at least in part on controlling the movable configuration so as to move at least a portion of an end tool that is mounted to the end tool mounting configuration within a movement volume;
the metrology system comprising:
a sensor configuration comprising a plurality of light beam sensors located at fixed positions;
a light beam source configuration that is configured to direct light beams to light beam sensors of the sensor configuration to indicate a position and orientation of the light beam source configuration, wherein:
the light beam source configuration is configured to be coupled to at least one of an end tool or the end tool mounting configuration;
at least some light beams that are directed toward the light beam sensors are configured to produce measurement spots in positions on the light beam sensors that cause the light beam sensors to produce corresponding measurement signals; and
a processing portion configured to process measurement signals from the light beam sensors of the sensor configuration to determine a position and orientation of the light beam source configuration,
wherein as part of a first operating mode, during which the movement system is configured to move the end tool and correspondingly the light beam source configuration to a plurality of positions, for each position the metrology system is configured to:
determine a region of interest for each light beam sensor of a set of light beam sensors, wherein each region of interest includes a measurement spot produced by a light beam from the light beam source configuration;
process measurement signals resulting from the regions of interest of the light beam sensors; and
determine a position and orientation of the light beam source configuration based at least in part on the processed measurement signals.

2. The metrology system of claim 1, wherein the determining of the regions of interest comprises determining positions of the regions of interest on the respective light beam sensors.

3. The metrology system of claim 2, wherein the regions of interest are determined based at least in part on position information that is received from the movement system.

4. The metrology system of claim 1, wherein the determining of the regions of interest comprises determining sizes of the regions of interest on the respective light beam sensors.

5. The metrology system of claim 1, wherein as part of a second operating mode that is an alternative to the first operating mode, during which the movement system is configured to move the end tool and correspondingly the light beam source configuration to a plurality of positions, for each position the metrology system is configured to:
process measurement signals from full sensing areas of the light beam sensors; and
determine a position and orientation of the light beam source configuration based at least in part on the processed measurement signals.

6. The metrology system of claim 1, wherein each region of interest is a minority of the full sensing area of the light beam sensor.

7. The metrology system of claim 1, wherein:
for a first position of the light beam source configuration, for which a first light beam is directed toward and produces a first measurement spot at a first position on a first light beam sensor, the region of interest that is determined is a first region of interest that includes the first measurement spot in the first position;
for a movement of the light beam source configuration from the first position to a second position, such as results in a movement of the first light beam and a corresponding movement of the first measurement spot from a first position to a second position on the first light beam sensor, the region of interest that is determined is the first region of interest which includes the first measurement spot at the second position and corresponds to a movement of the first region of interest to correspondingly maintain the first measurement spot within the first region of interest.

8. The metrology system of claim 7, wherein the determining of the region of interest at the second position is based at least in part on position information from the movement system which indicates the movement of the light beam source configuration and the corresponding movement of the first light beam and the corresponding movement of the first measurement spot on the first light beam sensor.

9. The metrology system of claim 1, wherein:
for a first position of the light beam source configuration, for which a first light beam is directed toward and produces a first measurement spot at a first position on a first light beam sensor, the region of interest that is determined for the first light beam sensor is a first region of interest that includes the first measurement spot in the first position, and a second light beam is not directed toward the first light beam sensor;
for a movement of the light beam source configuration from the first position to a second position, such as results in a movement of the first light beam to no longer be directed toward the first light beam sensor and for the second light beam to be directed toward and produce a second measurement spot on the first light beam sensor, the region of interest that is determined for the first light beam sensor is the first region of interest which is determined so as to include the second measurement spot on the first light beam sensor.

10. The metrology system of claim 9, wherein:
for the second position of the light beam source configuration, for which the first light beam is directed toward and produces a first measurement spot at a position on a second light beam sensor, the region of interest that is determined for the second light beam sensor is a second region of interest that includes the first measurement spot in the position.

11. The metrology system of claim 1, wherein the utilization of the regions of interest in the first operating mode reduces the required time and processing of the measurement signals from the light beam sensors, in relation to a second operating mode in which the full sensing areas of the light beam sensors are utilized for the processing of the measurement signals.

12. The metrology system of claim 1, wherein for a first light beam sensor on which a plurality of measurement spots are produced by a plurality of light beams that are directed towards the first light beam sensor, measurement signals that would result from measurement spots outside of the first region of interest are not processed to determine the position and orientation of the light beam source configuration.

13. The metrology system of claim 1, wherein each of the light beam sensors comprises a two dimensional position sensitive sensor, for which the measurement signals from the light beam sensors indicate the two dimensional positions of measurement spots on the light beam sensors that are produced by light beams.

14. The metrology system of claim 1, wherein a metrology frame volume is defined at least in part by the plurality of light beam sensors located at the fixed positions, for which the metrology frame volume is configured to surround at least part of the movement volume.

15. The metrology system of claim 1, wherein the light beam source configuration comprises one or more diffractive optical elements and at least some of the light beams from the light beam source configuration are diffracted light beams.

16. The metrology system of claim 1, wherein:
the motion control system is configured to sense and control a position and orientation of the end tool with a level of accuracy defined as a movement system accuracy, based at least in part on sensing and controlling the position and orientation of the end tool using a plurality of position sensors included in the movable configuration; and
the processing portion is operable to determine a position and orientation of the end tool with an accuracy level that is better than the movement system accuracy, based at least in part on processing the measurement signals from the light beam sensors to determine a position and orientation of the light beam source configuration, and for which the position and orientation of the light beam source configuration are indicative of the position and orientation of the end tool.

17. The metrology system of claim 16, wherein:
for the first position of the light beam source configuration, the light beams directed by the light beam source configuration to the sensor configuration include a first light beam, and a determination of which light beam sensor the first light beam is directed to is based at least in part on a sensed position and orientation with movement system accuracy as determined by utilizing the plurality of position sensors included in the movable configuration; and
the light beam sensor that the first light beam is directed to is the first light beam sensor, for which a first region of interest is determined that includes a first measurement spot as produced by the first light beam, and the processing portion is operable to determine the position and orientation of the end tool with an accuracy level that is better than the movement system accuracy, based at least in part on processing a first measurement signal from the first region of interest of the first light beam sensor, for which the first measurement signal indicates a position of the first measurement spot as formed by the first light beam on the first light beam sensor.

18. The metrology system of claim 1, wherein for one or more of the light beam sensors of the set of light beam sensors, a plurality of regions of interest are determined on each of the one or more light beam sensors, wherein each region of interest includes a measurement spot produced by a light beam from the light beam source configuration.

19. A method for operating a metrology system for use with a movement system that moves an end tool,
the movement system comprising:
a movable configuration comprising an end tool mounting configuration that an end tool is configured to mount to; and
a motion control system configured to control an end tool position and orientation, based at least in part on controlling the movable configuration so as to move at least a portion of an end tool that is mounted to the end tool mounting configuration within a movement volume,
the method comprising:
determining that the metrology system will be operated in a first operating mode; and
operating the metrology system in the first operating mode, during which the movement system moves the end tool and correspondingly a light beam source configuration to a plurality of positions, and for each position the metrology system:
operates the light beam source configuration to direct light beams to light beam sensors of a sensor configuration to indicate a position and orientation of the light beam source configuration, wherein:
the light beam source configuration is coupled to at least one of the end tool or the end tool mounting configuration of the movement system that moves the end tool;
the position and orientation of the light beam source configuration are indicative of a position and orientation of the end tool;
the sensor configuration comprises a plurality of light beam sensors located at fixed positions; and
at least some of the light beams that are directed toward the light beam sensors produce measurement spots in positions on the light beam sensors that cause the light beam sensors to produce corresponding measurement signals; and
determines a region of interest for each light beam sensor of a set of light beam sensors, wherein each region of interest includes a measurement spot produced by a light beam from the light beam source configuration;
processes measurement signals resulting from the regions of interest of the light beam sensors; and
determines a position and orientation of the light beam source configuration based at least in part on the processed measurement signals.

20. The method of claim 19, further comprising:
determining that the metrology system will be operated in a second operating mode that is an alternative to the first operating mode; and
operating the metrology system in the second operating mode, during which the movement system moves the end tool and correspondingly the light beam source configuration to a plurality of positions, and for each position the metrology system:
operates the light beam source configuration to direct light beams to light beam sensors of the sensor configuration to indicate a position and orientation of the light beam source configuration;
processes measurement signals from full sensing areas of the light beam sensors; and
determines a position and orientation of the light beam source configuration based at least in part on the processed measurement signals.

21. A metrology system, comprising:
a sensor configuration comprising a plurality of light beam sensors located at fixed positions;
a light beam source configuration that is configured to direct light beams to the light beam sensors of the sensor configuration to indicate a position and orientation of the light beam source configuration, wherein:
the light beam source configuration is configured to be coupled to at least one of an end tool or an end tool mounting configuration of a movement system that moves the end tool;
the position and orientation of the light beam source configuration are indicative of a position and orientation of the end tool; and
at least some light beams that are directed toward the light beam sensors are configured to produce measurement spots in positions on the light beam sensors that cause the light beam sensors to produce corresponding measurement signals; and
a processing portion configured to process the measurement signals from the light beam sensors of the sensor configuration to determine a position and orientation of the light beam source configuration,
wherein as part of a first operating mode, during which the movement system is configured to move the end tool and correspondingly the light beam source configuration to a plurality of positions, for each position the metrology system is configured to:
determine a region of interest for each light beam sensor of a set of light beam sensors, wherein each region of interest includes a measurement spot produced by a light beam from the light beam source configuration;
process measurement signals resulting from the regions of interest of the light beam sensors; and
determine a position and orientation of the light beam source configuration based at least in part on the processed measurement signals.

* * * * *